United States Patent
Yamaoka et al.

(10) Patent No.: US 8,855,563 B2
(45) Date of Patent: Oct. 7, 2014

(54) COMMUNICATION APPARATUS AND COMMUNICATION METHOD

(75) Inventors: Masaru Yamaoka, Osaka (JP); Michihiro Matsumoto, Kyoto (JP); Shohji Ohtsubo, Osaka (JP); Masao Nonaka, Osaka (JP); Mitsuaki Oshima, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 310 days.

(21) Appl. No.: 13/394,455

(22) PCT Filed: Jun. 17, 2011

(86) PCT No.: PCT/JP2011/003479
§ 371 (c)(1),
(2), (4) Date: Mar. 6, 2012

(87) PCT Pub. No.: WO2012/004939
PCT Pub. Date: Jan. 12, 2012

(65) Prior Publication Data
US 2012/0164944 A1  Jun. 28, 2012

(30) Foreign Application Priority Data

Jul. 7, 2010  (JP) .................................. 2010-155248

(51) Int. Cl.
H04B 7/00 (2006.01)
H04B 5/00 (2006.01)
G06K 7/10 (2006.01)

(52) U.S. Cl.
CPC ........ G06K 7/10237 (2013.01); G06K 7/10227 (2013.01); G06K 7/10198 (2013.01); G06K 7/10207 (2013.01)
USPC ........................................ 455/41.2; 455/41.1

(58) Field of Classification Search
CPC .......... G06K 7/10198; G06K 7/10207; G06K 7/10227; G06K 7/10237
USPC ............................................... 455/41.1, 41.2
See application file for complete search history.

(56) References Cited

U.S. PATENT DOCUMENTS 8,326,224 B2  12/2012 Butler
2006/0209060 A1*  9/2006 Tanada et al. ................. 345/211
(Continued)

FOREIGN PATENT DOCUMENTS

EP  2 088 540  8/2009
GB  2 456 850  7/2009
(Continued)

OTHER PUBLICATIONS

Extended European Search Report issued Jun. 14, 2013 in corresponding European patent application No. 11803281.2.
(Continued)

*Primary Examiner* — Ping Hsieh
*Assistant Examiner* — Xin Jia
(74) *Attorney, Agent, or Firm* — Wenderoth, Lind & Ponack, L.L.P.

(57) ABSTRACT

A terminal apparatus (M101) includes a terminal unit (M201) and a near-field communication unit (M107). The terminal unit (M201) includes a main memory (M106) that stores operation history information of the terminal apparatus (M101) and a controller (M105). The near-field communication unit (M107) includes a communication control unit (M216) that performs near-field communication with the mobile apparatus (M102) and a near-field communication memory (M215). The controller (M105) stores, in the near-field in communication memory (M215), at least a part of the operation history information stored in the main memory (M106) when a malfunction of the terminal unit (M201) is detected, and the communication control unit (M216) transmits the operation history information stored in the near-field communication memory (M215) is by near-field communication to the mobile apparatus (M102), in accordance with a request from the mobile apparatus (M102).

11 Claims, 14 Drawing Sheets

(56) References Cited

U.S. PATENT DOCUMENTS

| | | | |
|---|---|---|---|
| 2009/0150639 A1* | 6/2009 | Ohata | 711/172 |
| 2010/0291870 A1 | 11/2010 | Butler | |
| 2010/0291871 A1 | 11/2010 | Butler | |
| 2010/0327945 A1 | 12/2010 | Caruana et al. | |
| 2011/0007901 A1* | 1/2011 | Ikeda et al. | 380/270 |
| 2012/0216005 A1* | 8/2012 | Naito et al. | 711/165 |

FOREIGN PATENT DOCUMENTS

| | | |
|---|---|---|
| JP | 2003-263615 | 9/2003 |
| JP | 2005-115766 | 4/2005 |
| JP | 2006-185392 | 7/2006 |
| JP | 2007-164541 | 6/2007 |
| JP | 2007-249542 | 9/2007 |
| JP | 2008-136104 | 6/2008 |
| JP | 2009-54090 | 3/2009 |

OTHER PUBLICATIONS

International Search Report issued Jul. 19, 2011 in International (PCT) Application No. PCT/JP2011/003479.

* cited by examiner

COMMUNICATION APPARATUS AND COMMUNICATION METHOD

TECHNICAL FIELD

The present invention relates to a communication apparatus and a communication method, and more particularly to a communication apparatus that employs near-field communication.

BACKGROUND ART

As an example of communication apparatuses that employ near-field communication, a technique has been disclosed that assigns a wireless communication IC tag to a vehicle or the like and transmits history information together with an ID stored in the IC tag is to a history information storage device connected to the IC tag through a network (for example, see PTL 1).

The communication system according to PTL 1 includes a wireless IC tag attached to an object that generates history information so as to transmit the history information, and a history information storage device connected to the wireless IC tag through a network and configured to accumulate the history information, and the wireless IC tag includes a history information acquisition unit that acquires the generated history information, a storage unit that stores an exclusive ID being the identification information assigned to the wireless IC tag, and a transmission unit that periodically transmits the history information and the exclusive ID of the wireless IC tag to the history information storage device through the network. The history information storage device accumulates the received history information with respect to each ID exclusively assigned to the wireless IC tag.

In addition, a technique is disclosed that provides an environmental burden calculation system that can accurately calculate a level of environmental burden during use of an apparatus, an environmental burden calculating device, and a method of calculating the environmental burden level (for example, see PTL 2).

According to PTL 2, an electronic apparatus includes a function execution unit that performs a plurality of functions, an operation history collection unit that collects operation histories of each of the plurality of functions, and an IC tag that records the operation histories of each of the plurality of functions collected by the operation history collection unit, and the operation histories recorded in the IC tag are wirelessly transmitted to an IC reader, so that a computer calculates the environmental burden level.

Thus, the techniques according to PTL 1 and PTL 2 are employed for continuously transmitting the history information from a near-field communication unit such as the IC tag.

Further, a technique is known that establishes communication by bringing a communication apparatus and a reader-writer apparatus close to each other (bring the reader-writer apparatus closely opposite the communication apparatus, or into touch therewith).

As an example of such a technique, an information processing apparatus has been developed that enables failure information of a system to be taken out for the purpose of a maintenance work or the like, in case of a critical failure such that the system itself is unable to be activated (for example, see PTL 3).

The information processing apparatus according to PTL 3 includes a main power source that supplies power to the system, a power source unit provided between the main power source and the system so as to control the power supply from the main power source to the system, an abnormality monitor unit that watches abnormal power supply to the system, or watches abnormal operation of the system, and a failure information notification unit incorporated inside the information processing apparatus and including a memory for storing the failure information. The abnormality monitor unit stores, in the memory of the failure information notification unit, the abnormal power supply to the system and the abnormal operation of the system that have been monitored, as the failure information. The failure information notification unit includes a sub power source apart from the main power source, and supplies power from the sub power source so as to read out the failure information stored in the memory and transmit the failure information to outside.

CITATION LIST

Patent Literature

[PTL 1] Japanese Unexamined Patent Application Publication No. 2006-185392
[PTL 2] Japanese Unexamined Patent Application Publication No. 2007-249542
[PTL 3] Japanese Unexamined Patent Application Publication No. 2005-115766

SUMMARY OF INVENTION

Technical Problem

However, the techniques according to PTL 1 and PTL 2 are employed for continuously transmitting the history information from a near-field communication unit such as the IC tag. The technique according to PTL 3 is for transmitting only the failure information when the reader-writer apparatus is brought close to the apparatus. These techniques have, therefore, a drawback in that the history information leading to the failure is unable to be transmitted by near-field communication to the reader-writer apparatus together with the failure information.

More specifically, in the case of making communication by bringing a communication apparatus and a reader-writer apparatus close to each other as described above, the memory capacity for storing the history information and amount of communication data are limited. Accordingly, applying the techniques according to PTL 1 and PTL 2 to the communication made by bringing a communication apparatus and a reader-writer apparatus close to each other may fail to enable important history information leading to the failure to be transmitted to the reader-writer apparatus. For example, the history information may be overwritten after the occurrence of the failure.

Accordingly, the present invention has been accomplished in view of the foregoing problem, with an object to provide a communication apparatus that allows history information leading to a failure to be transmitted upon being disposed close to a reader-writer apparatus.

Solution to Problem

To achieve the foregoing object, an aspect of the present invention provides a communication apparatus including a system unit and a near-field communication unit. The system unit includes an operation history detection unit configured to generate operation history information of the communication apparatus; an error detection unit configured to detect a malfunction of the system unit and generate error detection information about the malfunction; a main storage unit configured to store the operation history information; and a system control unit configured to control the communication apparatus. The near-field communication unit includes an antenna unit configured to receive a radiowave from an external reader-writer apparatus; a communication control unit configured to perform near-field communication with the reader-writer apparatus through the antenna unit; and a near-field communication memory configured to store identification information that allows the communication apparatus to be identified, the near-field communication memory being readable by the reader-writer apparatus. The system control unit is configured to store, in the near-field communication memory, the error detection information and at least a part of the operation history information stored in the main storage unit, when the error detection unit detects a malfunction of the system unit, and the communication control unit is configured to transmit the identification information, the operation history information, and the error detection information stored in the near-field communication memory to the reader-writer apparatus by near-field communication, in accordance with a request from the reader-writer apparatus.

The foregoing configuration enables the communication apparatus to read out the operation history information leading to the malfunction, which is essential for analyzing the malfunction, from the external reader-writer apparatus. Accordingly, even though the main system (system unit) of the communication apparatus becomes inoperable owing to the malfunction, the essential operation history information can be read out. In addition, the communication apparatus configured as above stores the operation history information leading to the malfunction in the near-field communication memory. Such an arrangement prevents the history information from being overwritten after the occurrence of the malfunction. Thus, the communication apparatus configured as above can transmit the essential history information leading to the malfunction of the communication apparatus to the reader-writer apparatus upon being located close thereto, which facilitates the analysis of the malfunction.

Preferably, the near-field communication unit may further include a power source generation unit configured to generate a power source for activating the near-field communication unit, by rectifying the radiowave received from the reader-writer apparatus through the antenna unit; and a power source switching unit configured to select one of the power source generated by the power source generation unit and a power source supplied by the system unit, as a driving power source for the near-field communication unit, and the power source switching unit may be configured to select the power source supplied by the system unit as the driving power source for the near-field communication unit, when the error detection unit detects a malfunction of the system unit.

Such an arrangement allows the system unit to supply the power source to the near-field communication unit, for writing the operation history information detected by the system unit upon occurrence of the malfunction in the near-field communication memory. Therefore, the communication apparatus configured as above can stably write the operation history information in the near-field communication memory.

Preferably, the near-field communication unit may further include a clock generation unit configured to generate a clock signal for activating the near-field communication unit by rectifying the radiowave received from the reader-writer apparatus through the antenna unit the antenna unit; and a clock switching unit configured to select one of the clock signal generated by the clock generation unit and a clock signal supplied by the system unit, as the clock signal for activating the near-field communication unit, and the clock switching unit may be configured to select the clock signal supplied by the system unit as the clock signal for activating the near-field communication unit, when the error detection unit detects a malfunction of the system unit.

Such an arrangement allows the system unit to supply the clock to the near-field communication unit, for writing the operation history information detected by the system unit upon occurrence of the malfunction in the near-field communication memory. Therefore, the communication apparatus configured as above can stably write the operation history information in the near-field communication memory.

Preferably, the power source switching unit and the clock switching unit may be configured to select the power source generated by the power source generation unit as the driving power source for the near-field communication unit, during a normal operation free from a malfunction detected by the error detection unit, and may select the clock signal generated by the clock generation unit as the clock signal for activating the near-field communication unit.

Such an arrangement allows the communication apparatus to transmit the content stored in the near-field communication memory to the external reader-writer apparatus by bringing the reader-writer apparatus close to the communication apparatus, during the normal operation free from a malfunction.

Preferably, the power source switching unit and the clock switching unit may be configured to switch the power source and the clock signal to be selected, in accordance with a request from the system control unit.

Preferably, the main storage unit may be configured to store the operation history information generated by the operation history detection unit by a wraparound addressing method, and may further maintain an address position of the operation history information stored last in the main storage unit, and the system control unit may be configured to cause the near-field communication memory to store the operation history information stored in the main storage unit by using the address position as reference, when the error detection unit detects a malfunction of the system unit.

Such an arrangement allows the communication apparatus configured as above to securely maintain the essential operation history leading to the malfunction, despite that the capacity of the memory is limited.

Preferably, the system control unit may be configured to confirm a storage capacity of the near-field communication memory when the error detection unit detects a malfunction of the system unit, to thereby determine a capacity for the operation history information to be stored in the near-field communication memory.

Such an arrangement allows the communication apparatus configured as above to securely store the operation history information leading to the malfunction, which is essential for analyzing the malfunction in the memory that can be read out by the external reader-writer apparatus.

Preferably, the near-field communication memory may be configured to delete the operation history stored therein by the near-field communication unit, after the near-field communication unit transmits the operation history information to the reader-writer apparatus through the antenna unit.

Such an arrangement allows the communication apparatus configured as above to secure the region for accumulating the operation history information when an additional malfunction occurs. Thus, the communication apparatus enables efficient utilization of the limited memory capacity.

The present invention may be realized not only as the foregoing communication apparatus, but also as a communication method including the distinctive operations performed by the constituents of the communication apparatus, or as a program that causes a computer to execute the distinctive operations. Further, such a program may naturally be distributed through a recording medium such as a compact disc read-only memory (CD-ROM) or a transmission medium such as the Internet.

Further, the present invention may also be realized as a semiconductor large-scale integrated circuit (LSI) that performs a part or whole of the functions of the communication apparatus.

Advantageous Effects of Invention

Thus, the present invention provides a communication apparatus that allows history information leading to a malfunction to be transmitted upon being disposed close to a reader-writer apparatus.

DESCRIPTION OF EMBODIMENTS

Figure 1:
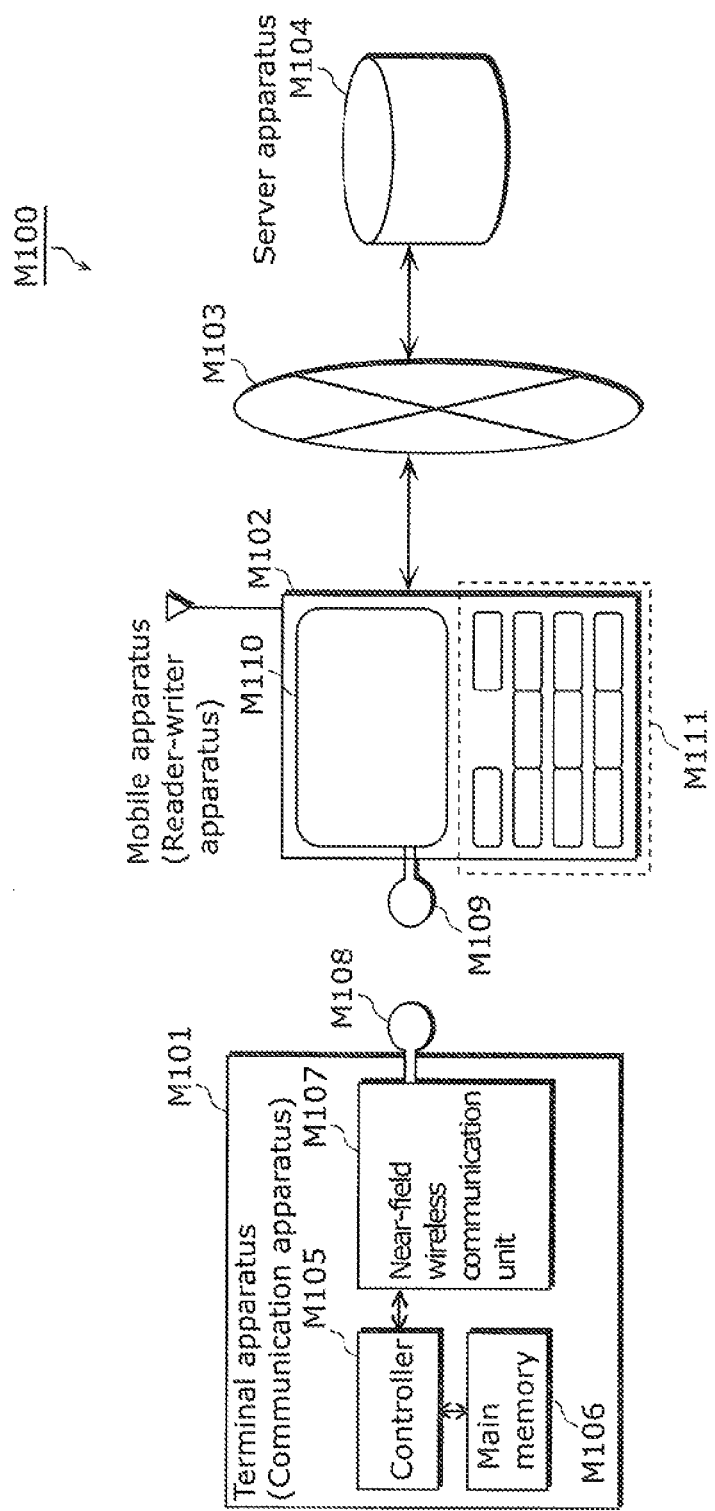
FIG. 1 is a schematic block diagram showing a configuration of a communication system according to an embodiment of the present invention.

Hereafter, an embodiment of the present invention will be described referring to the drawings.

Regarding this embodiment, detailed description will be made in referring to the drawings on a communication system that includes a terminal apparatus capable of performing near-field communication, a mobile apparatus that performs the near-field communication with the terminal apparatus, and a server apparatus connected to the mobile apparatus through a wide-use network such as the Internet or mobile phone communication network. The communication system registers sensing information of the terminal apparatus and so forth in a database of the server apparatus through the reader-writer apparatus.

FIG. 1 is a schematic block diagram showing a general configuration of the communication system according to this embodiment. The communication system M100 shown in FIG. 1 includes a terminal apparatus M101, a mobile apparatus M102, and a server apparatus M104.

The terminal apparatus M101 and the mobile apparatus M102 can mutually communicate by near-field communication. In this embodiment, the near-field communication will be assumed to be (1) communication between a radio-frequency identification (RFID, ISO14443) tag that utilizes 13.56 MHz band (HF band) by electromagnetic induction or radiowave of 52 to 954 MHz band (UHF band) and the reader-writer apparatus, or (2) communication that utilizes near-field communication, (NFC, ISO/IEC21481) at 13.56 MHz band. Normally, since the communication distance is limited to tens of centimeters in the HF band and a few centimeters in the UHF band, the communication is established by bringing the mobile apparatus closely opposite (or into touch with) the terminal apparatus.

This embodiment exemplifies a case where the mobile apparatus M102 is implemented with a reader-writer function, and the terminal apparatus M101 is implemented with an IC tag function. However, in this embodiment it suffices that the terminal apparatus M101 and the mobile apparatus M102 are configured so as to exchange information by near-field communication. For example, a configuration in which the mobile apparatus M102 is implemented with the IC tag function and the terminal apparatus M101 is implemented with the reader-writer function is included in the scope of the present invention. In addition, for the NFC a P-to-P communication function, card emulation, and reader-writer emulation are standardized. In this case it is not an issue which of those functions is given to the IC tag and the reader-writer apparatus. This embodiment adopts the configuration in which the mobile apparatus M102 is implemented with the reader-writer function and the terminal apparatus M101 is implemented with the IC tag function, for the sake of convenience of description.

The terminal apparatus M101 includes a controller M105, a main memory M106, a near-field communication unit M107, and an antenna M108.

The controller M105 is, for example, a CPU serving as a system controller of the terminal apparatus M101. The controller M105 controls the system of the terminal apparatus M101, at least with respect to the components other than the near-field communication unit M107.

The main memory M106 is capable of storing therein control software for realizing operations of the controller M105 and all data acquired through sensing by the terminal apparatus M101, and normally mounted in an LSI of the controller M105 (naturally, an external memory may be employed). The main memory M106 may be constituted of a RAM or a non-volatile memory, for example.

The near-field communication unit M107 makes communication with the reader-writer apparatus implemented in the mobile apparatus M102. The near-field communication unit M107 modulates data to be transferred to the reader-writer apparatus, and demodulates data transferred from the reader-writer apparatus. The near-field communication unit M107 also generates power for in establishing at least the near-field communication on the basis of radiowave received from the reader-writer apparatus, and extracts a clock signal on the basis of the radiowave from the reader-writer apparatus. Accordingly, at least the near-field communication unit M107 of the terminal apparatus M101 is activated by the power and clock generated from the radiowave from the reader-writer apparatus. Therefore, the near-field communication unit M107 can perform the near-field communication with the mobile apparatus M102, even when the main power source of the terminal apparatus M101 is turned off.

The antenna M108 is a loop antenna for performing the near-field communication with the reader-writer apparatus implemented in the mobile apparatus M102.

The mobile apparatus M102 includes an antenna M109, a display unit M110, and a keypad M111.

The antenna M109 serves for the near-field communication with the terminal apparatus M101. The mobile apparatus M102 performs polling to the IC tag in the terminal apparatus M101, and reads and writes information from and in the terminal apparatus M101, upon establishing communication.

The display unit M110 displays a result of the near-field communication between the mobile apparatus M102 and the terminal apparatus M101, and data transmitted from the server apparatus M104. The display unit M110 may be exemplified by an LCD.

The keypad M111 is an interface to be manipulated by a user for operating the mobile apparatus M102. In accordance with an input of the user through the keypad M111, the mobile apparatus M102 activates the near-field communication unit installed therein and starts, upon activation, the polling to the terminal apparatus M101 for establishing the near-field communication. Normally radiowave is continuously outputted to unspecified parties during the polling, which is disadvantageous to the battery-driven mobile apparatus M102 in the aspect of battery life. Accordingly, providing an exclusive button for polling on the mobile apparatus M102 restricts the mobile apparatus M102 from performing the polling and alleviates the burden of operating the apparatus on the user.

The server apparatus M104 contains a database. Normally the server apparatus M104 is constituted of a WEB server containing a database. The server apparatus M104 is connected to the mobile apparatus M102 through the Internet M103. The server apparatus M104 registers information transferred from the mobile apparatus M102 in the database, and transfers information indicating the registration result to the mobile apparatus M102. Then the display unit M110 of the mobile apparatus M102 displays the same information.

With the foregoing system configuration, the information acquired through sensing by the terminal apparatus M101 can be registered in the database of the server apparatus M104 through the mobile apparatus M102. For example, information that allows the terminal apparatus M101 to be uniquely identified, such as serial number, model number, and manufacturer identification information, can be transferred from the terminal apparatus M101 to the mobile apparatus M102 by near-field communication. The mobile apparatus M102 also transfers, to the server apparatus M104, the information received from the terminal apparatus M101 by near-field communication, the information stored in the mobile apparatus M102 for identifying the user or the mobile apparatus M102 itself (mail address, telephone number, mobile terminal identification information, or a SIM card ID), and, in the case where the mobile apparatus M102 is capable of sensing position information, the information for identifying the position (GPS information, A-GPS information, or position information estimated on the basis of a base station in the mobile network). Further, the server apparatus M104 registers such information in the database. The foregoing series of operations exempt the user from the trouble of inputting various kinds of information. Practically, the user can execute customer registration with the terminal apparatus M101 simply by bringing the mobile apparatus M102 closely opposite the terminal apparatus M101.

In addition, transmitting a malfunction occurrence status or operation history information as sensing information of the terminal apparatus M101 allows the manufacturer to promptly recognize an initial failure of a specific production lot and take necessary actions. Further, the manufacturer can identify the functions utilized by each user on the basis of the operation history information, to thereby enjoy the advantage of, for example, reflecting the information in subsequent development of new products.

Hereafter, details of the terminal apparatus M101 according to this embodiment will be described referring to the drawings.

Figure 2:
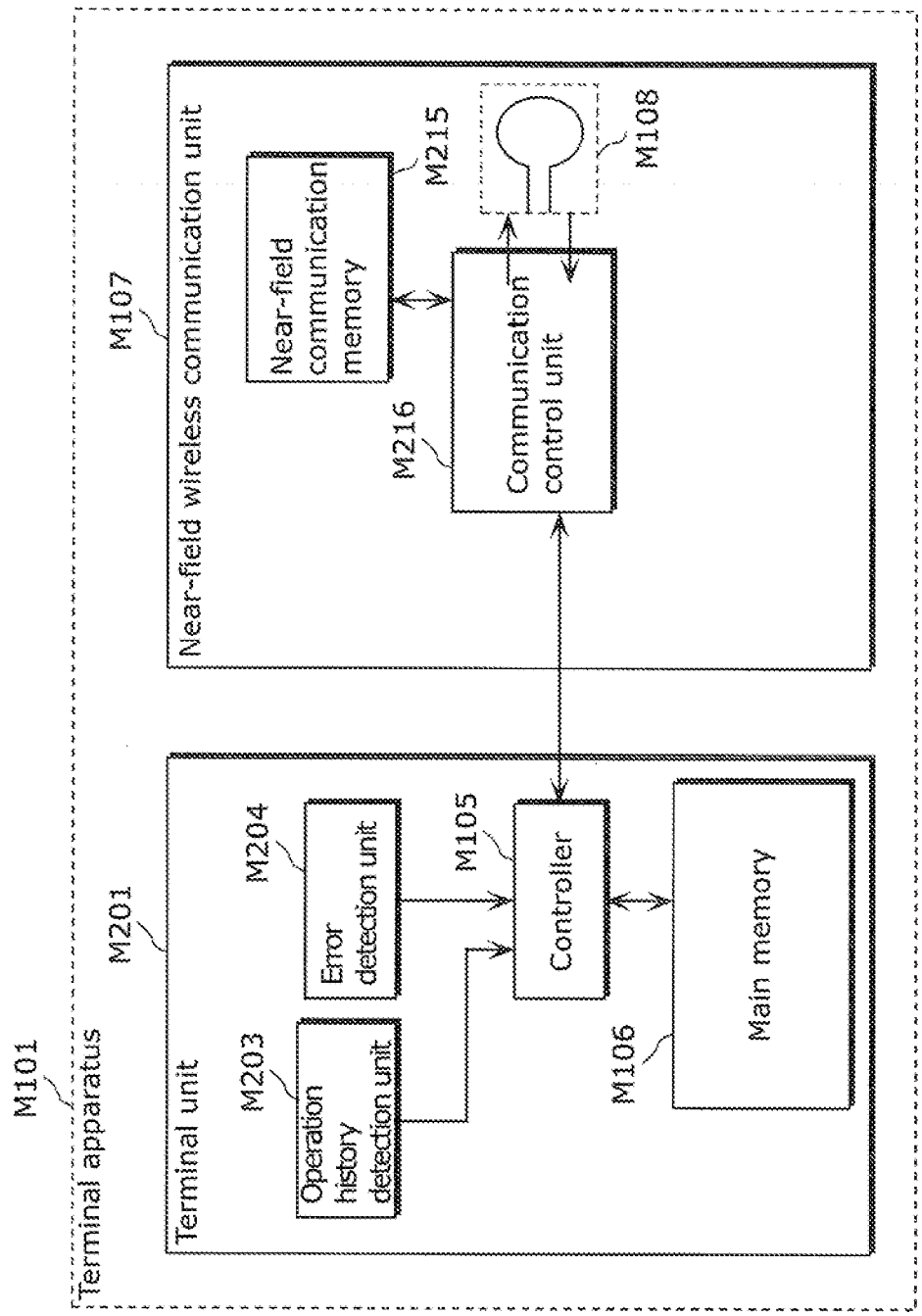
FIG. 2 is a block diagram showing a configuration of a terminal apparatus according to the embodiment of the present invention.

FIG. 2 is a block diagram showing a configuration of the terminal apparatus M101 according to this embodiment.

The terminal apparatus (communication apparatus) M101 includes a terminal unit (system unit) M201 and the near-field communication unit M107.

The terminal unit M201 includes an operation history detection as unit (operation history detection unit) M203, an error detection unit M204, the main memory (main storage unit) M106, and the controller (system control unit) M105.

The operation history detection unit M203 generates the operation history information (operation history information) that represents the operation history of the terminal apparatus M101.

The error detection unit M204 detects a malfunction of the terminal unit M201, and generates error detection information that represents the detail of the malfunction.

The main memory M106 stores the operation history information generated by the operation history detection unit M203.

The controller M105 controls the terminal apparatus M101.

The near-field communication unit M107 includes the antenna M108, a communication control unit M216, and a near-field communication memory M215.

The antenna M108 receives radiowave outputted from the mobile apparatus M102, which is an external reader-writer apparatus.

The communication control unit M216 performs the near-field communication with the mobile apparatus M102 through the antenna M108.

The near-field communication memory M215 stores the identification information that allows the terminal apparatus M101 to be identified. The near-field communication memory M215 can also be read by the mobile apparatus M102.

The controller M105 also stores, in the near-field communication memory M215, at least a part of the operation history information stored in the main memory M106 in association with the error detection information generated by the error detection unit M204, when the error detection unit M204 detects a malfunction of the terminal unit M201.

The communication control unit M216 also transmits, to the mobile apparatus M102, the operation history information stored in the near-field communication memory M215 in association with the identification information stored in the near-field communication memory M215, in accordance with a request from the mobile apparatus M102.

Figure 3:
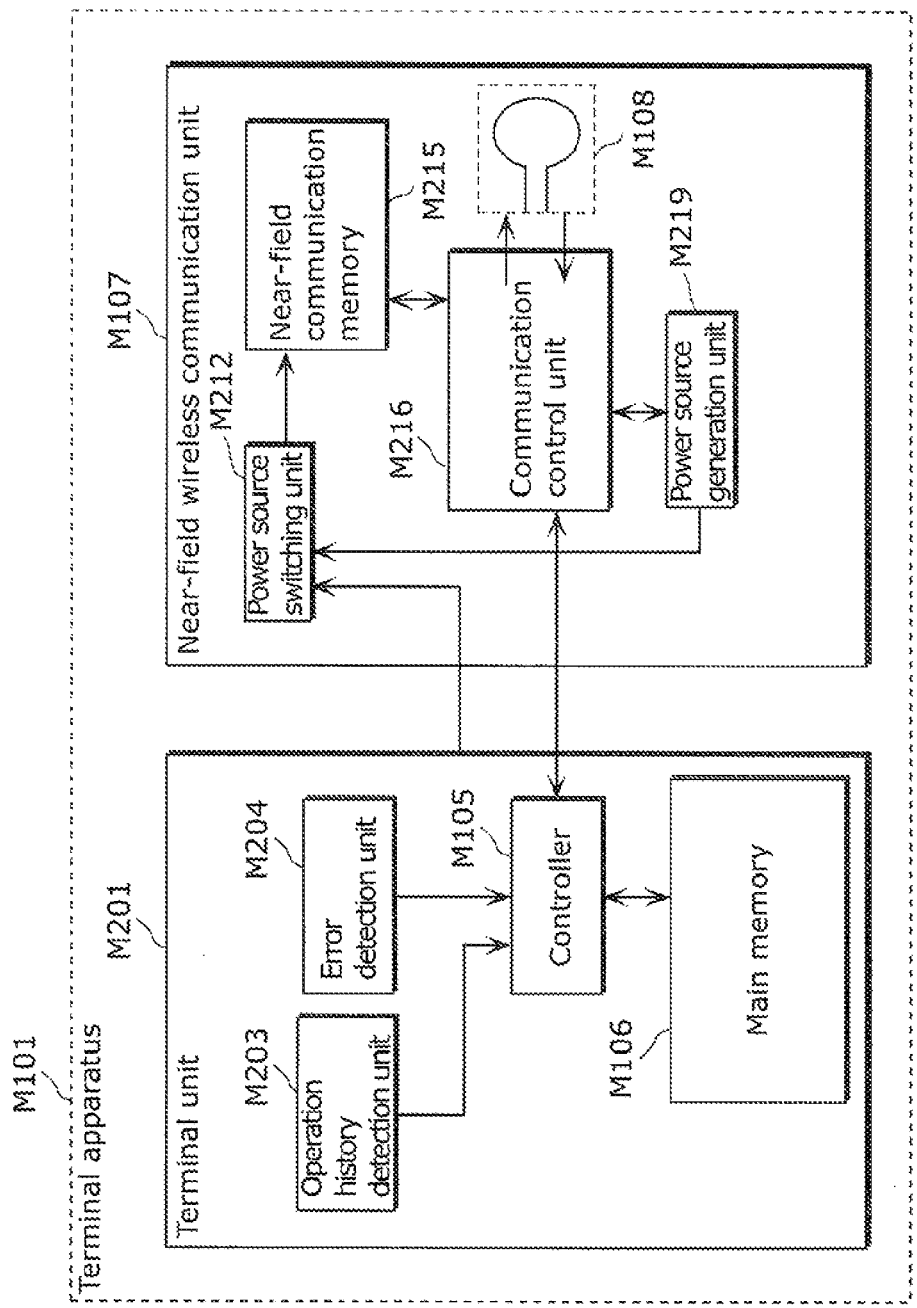
FIG. 3 is another block diagram showing a configuration of the terminal apparatus according to the embodiment of the present invention.

FIG. 3 is a block diagram showing a detailed configuration of the terminal apparatus M101 according to this embodiment.

As shown in FIG. 3, the near-field communication unit M107 further includes a power source generation unit M219 and a power source switching unit M212.

The power source generation unit M219 rectifies the radio-wave received from the mobile apparatus M102 through the antenna M108, to thereby generate a power source for activating the near-field communication unit M107.

The power source switching unit M212 selects one of the power source generated by the power source generation unit M219 and the power source supplied by the terminal unit M201, as the driving power source for the near-field communication unit M107. In the case where the error detection unit M204 has detected a malfunction of the terminal unit M201, the power source switching unit M212 selects the power source supplied by the terminal unit M201, as the driving power source for the near-field communication unit M107.

Figure 4:
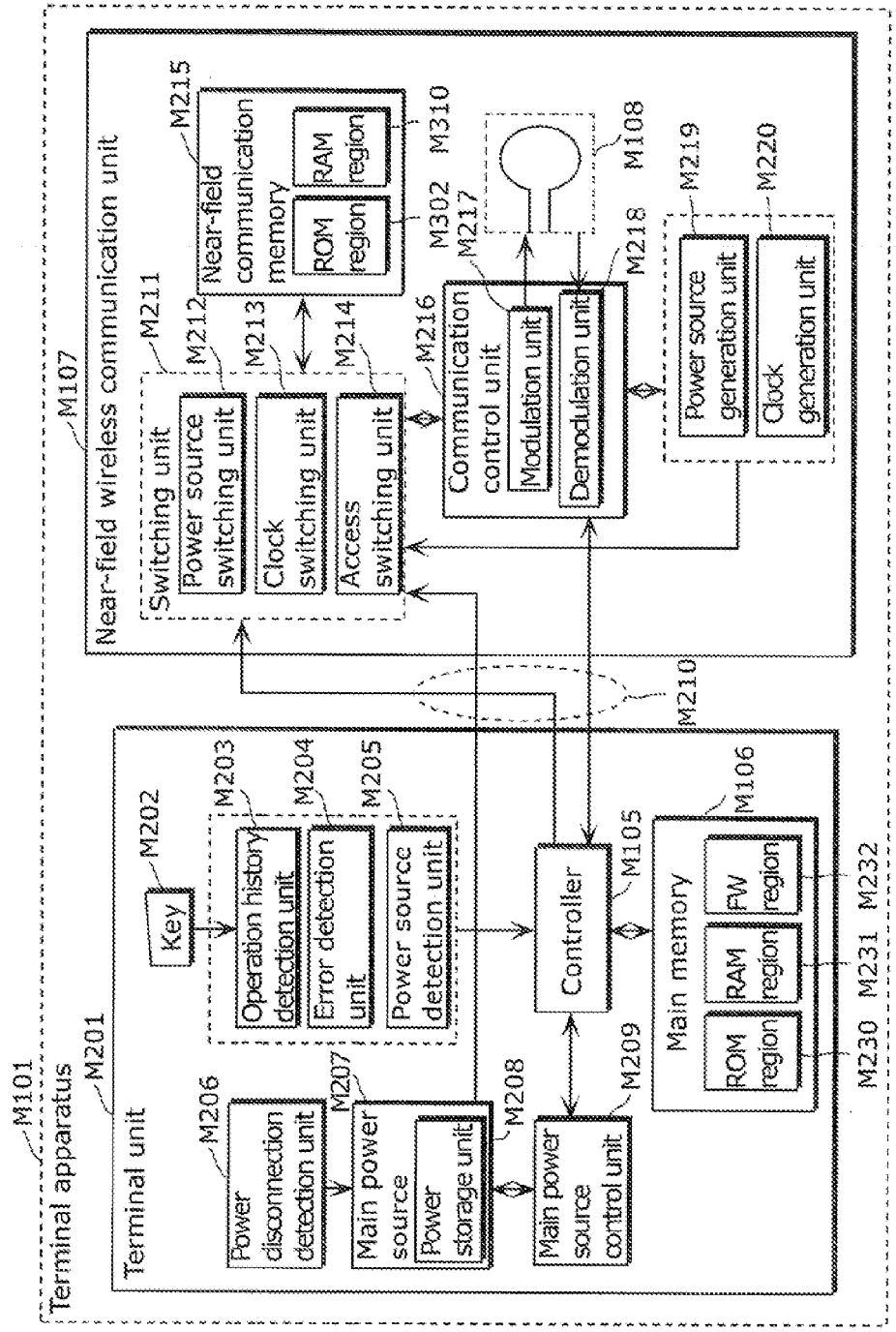
FIG. 4 is still another block diagram showing a configuration of the terminal apparatus according to the embodiment of the present invention.

FIG. 4 is a block diagram showing further details of the configuration of the terminal apparatus M101 according to this embodiment.

As shown in FIG. 4, the terminal unit M201 and the near-field communication unit M107 are connected to each other through an interface M210 (for example, serial interface or USB) that enables mutual communication.

The terminal unit M201 realizes main functions of the terminal apparatus M101. For example, the terminal unit M201 realizes a cooling function when the terminal apparatus M101 is a refrigerator, a heating function when the terminal apparatus M101 is a microwave oven, and an air-conditioning function when the terminal apparatus M101 is an air conditioner. The terminal apparatus M101 according to this embodiment may be exemplified by all types of electronic device terminals and home electric appliances. In this embodiment, accordingly, description of each individual apparatus will not be made, and only the functions common to the apparatuses will be described. Here, the terminal apparatus M101 may be other than the electronic device terminals and home electric appliances. For example, the terminal apparatus M101 may be a vehicle such as an automobile, or an agricultural machine.

The terminal unit M201 includes the controller M105, the main memory M106, a key M202, the operation history detection unit M203, the error detection unit M204, a power source detection unit M205, a power disconnection detection unit M206, a main power source M207, and a main power source control unit M209.

The controller M105 is a system controller capable of controlling at least the terminal unit M201 and a switching unit M211 of the near-field communication unit M107. The controller M105 is constituted of what is known as a microcomputer or a CPU.

The main memory M106 includes therein a ROM region M230 which is unrewritable, a RAM region M231 which is rewritable, and a FW region M232 where firmware (FW) containing a control procedure of the controller M105.

The ROM region M230 contains the identification information that allows the terminal unit M201 of the terminal apparatus M101 to be identified, such as the year/month/date of production and manufacturer identification information.

In the RAM region M231, the operation history information collected by the operation history detection unit M203, and the error id information of the terminal apparatus M101 detected by the error detection unit M204 are recorded.

The FW region M232 contains the firmware representing the control procedure of the controller M105. The FW region M232 may be either a ROM or RAM. In this embodiment, however, a RAM is employed as the FW region M232 to secure a function of updating the firmware.

The key M202 is an operation button for the terminal apparatus M101, for accepting an input by the user.

The operation history detection unit M203 detects, in accordance with the operation of the key M202 by the user, an operation history indicating the operations performed, as the operation history information, and accumulates the detected operation history information in the main memory M106. Here, the operation history information according to this embodiment also includes sensing information acquired through a sensor of the terminal apparatus, in addition to the operation of the user. The sensing information refers to, for example in the case of an air conditioner, a motion sensor, room temperature and outside temperature, humidity, dust content of air, and so forth. The operation history information also includes the date and time at which the operation or sensing has been performed. In the case where the terminal apparatus M101 is an apparatus that allows identification of the user, such as a personal computer, the Operation history information includes user identification information indicating the user who has performed the operation. Generally, the operation history information may be infinitely accumulated. Accordingly, it is preferable to configure the main memory M106 as a first-in/first-out (FIFO) stack memory that performs wraparound addressing. Such a configuration allows newer operation history information to be stored in the memory region in the main memory M106 assigned for accumulating the operation history information.

The power source detection unit M205 detects the status of a main power source M207 to be subsequently described. The "status" herein includes at least three states, namely a power-on state, a sleep mode in which the controller M105 can control the power source, and a power-off state. More specifically, the power source detection unit M205 detects the power-on state when the power is turned on. The power source detection unit M205 also detects the transition to the sleep mode or power-off state immediately before the controller M105 controls the power source so as to proceed to the sleep mode or power-off state, and stores the detected power source status (sleep mode or power-off state) in the main memory M106 or in the near-field communication memory M215 of the near-field communication unit M107.

The power disconnection detection unit M206 detects an accidental disconnection of power supply from outside such as an outlet to the terminal apparatus M101. The power disconnection detection unit M206 may detect the disconnection from the outlet for example by monitoring a drop of voltage applied to the main power source M207. The power disconnection detection unit M206 is activated by the power supplied by a power storage unit M208 provided in the main power source M207. Such a configuration allows the power disconnection detection unit M206 to stably detect the disconnection of the power source even though the power supply from an outlet is disconnected. The power disconnection detection unit M206 also notifies the detection result to the power source detection unit M205. Therefore, the power source detection unit M205 stores flag information indicating the disconnection of the power source in the main memory M106, or in the near-field communication memory M215 of the near-field communication unit M107.

The main power source M207 is the primary power source of the terminal apparatus M101, and supplies power from a battery or an outlet. The main power source M207 supplies power at least to the to terminal unit M201, and power for the near-field communication unit M107 to make access to the near-field communication memory M215.

The main power source control unit M209 starts to supply power (activate) or stop supplying power (terminate) in accordance with an activation command or termination command from the controller M105.

The near-field communication unit M107 is connected to the terminal unit M201 through a serial interface or the like, and includes the switching unit M211, the near-field communication memory M215, the communication control unit M216, the power source generation unit M219, a clock generation unit M220, and the antenna M108.

The antenna M108 is a loop antenna for receiving radiowave from an external reader-writer apparatus.

The communication control unit M216 includes a demodulation unit M218 that demodulates the radiowave received through the antenna M108, and a modulation unit M217 that modulates information to be transferred to the reader-writer apparatus through the antenna M108.

The power source generation unit M219 generates power sufficient for activating at least the near-field communication unit M107, by electromagnetic induction of the radiowave received through the antenna M108.

The clock generation unit M220 rectifies the radiowave from the reader-writer apparatus, to thereby generate a clock signal for activating the near-field communication unit M107. The clock generation unit M220 also supplies the generated clock signal to a digital circuit of the near-field communication unit M107.

The near-field communication unit M107 can be operated by the power source generated by the power source generation unit M219, on the basis of the clock signal generated by the clock generation unit M220. Accordingly, the near-field communication unit M107 can perform a passive tag function (batteryless mode) that enables transference of information stored in the near-field communication memory M215 to the reader-writer apparatus, reception of data transferred from the reader-writer apparatus, and storage of the transferred data in the near-field communication memory M215, upon receipt of radiowave from the reader-writer apparatus irrespective of the status of the main power source M207 of the terminal unit M201.

The near-field communication memory M215 includes therein a ROM region M302 and a RAM region M310. The ROM region M302 (unrewritable, or unupdatable once recorded in the production process) contains at least the identification information that allows the near-field communication unit M107 to be uniquely identified, the terminal apparatus identification information that allows the terminal apparatus M101 to be identified, the model number of the terminal apparatus M101, the address information of the server apparatus M104, and so forth. In the RAM region M310, the operation history information extracted by the operation history detection unit M203 of the terminal unit M201, the error information detected by the error detection unit M204, and the power source status information detected by the power source detection unit M205 are recorded from the controller M105. Information transferred from the reader-writer apparatus is also once stored in the RAM region M310. Thus, a part of the information recorded in the main memory M106 is stored by mirroring in the RAM region M310.

The switching unit M211 includes the power source switching unit M212, a clock switching unit M213, and an access switching unit M214.

The power source switching unit M212 switches the driving power source for the near-field communication memory M215 to between the terminal unit M201 and the power source generated by the power source generation unit M219.

The clock switching unit M213 selects one of the clock signal generated by the clock generation unit M220 and the clock signal supplied by the terminal unit M201, as the clock signal for activating the near-field communication memory M215. The clock switching unit M213 also supplies the selected clock signal to the near-field communication memory M215.

The switching unit M211 supplies, unless instructed by the controller M105, the power source generated by the power source generation unit M219 and the clock signal extracted by the clock generation unit M220 to the near-field communication memory M215. The switching unit M211 controls, in accordance with the instruction of the controller M105, so as to supply the power source and the clock signal from the terminal unit M201, for looking up or rewriting the content in the near-field communication memory M215 on the basis of an access from the controller M105.

In other words, the power source switching unit M212 selects the power source supplied from the terminal unit M201 as the driving power source for the near-field communication unit M107, in the case where the error detection unit M204 has detected a malfunction of the terminal unit M201. Likewise, the clock switching unit M213 selects the clock signal supplied from the terminal unit M201 as the clock signal for activating the near-field communication unit M107, in the case where the error detection unit M204 has detected a malfunction of the terminal unit M201.

Further, the power source switching unit M212 selects the power source generated by the power source generation unit M219 as the driving power source for the near-field communication unit M107, during normal operation free from a malfunction detected by the error detection unit M204. Likewise, the clock switching unit M213 selects the clock signal generated by the clock generation unit M220 as the clock signal for activating the near-field communication unit M107, during normal operation free from a malfunction detected by the error detection unit M204.

In addition, the power source switching unit M212 and the clock switching unit M213 switches the power source and the clock signal to be selected, in accordance with a request from the controller M105.

The access switching unit M214 controls the access from the controller M105 and the near-field communication unit M107 to the near-field communication memory M215.

It is preferable that the switching unit M211 performs the control on the first-come-first-served basis. For example, in the case where the switching unit M211 receives a switching instruction from the controller M105 while the near-field communication memory M215 is being accessed by near-field communication, the switching unit M211 notifies the controller M105 to the effect that the access is being made, and rejects the switching instruction. Conversely, in the case where the switching unit M211 receives a request for access to the near-field communication memory M215 by near-field communication while the controller M105 is making access to the near-field communication memory M215, the switching unit M211 does not switch the power source not the clock signal as long as the controller M105 is making access. Such an arrangement prevents the content of the near-field communication memory M215 from being simultaneously updated by the access from two parties to the near-field communication memory M215. Alternatively, at least the RAM region M310 of the near-field communication memory M215 may be redundantly configured so as to simultaneously accept an access from two parties. In this case, neither party has to wait while the other is making access, which leads to realization of quicker access.

With the foregoing configuration, the terminal apparatus M101 according to the embodiment of the present invention effectively works in the following cases. For example, once the error detection unit M204 has detected an error, the controller M105 stores operation history information M317 stored in the main memory M106 and error detection information M316 in the near-field communication memory is M215. Accordingly, the operation history leading to the error is accumulated in the near-field communication memory M215, even though the detected error has disabled the terminal unit M201 from operating. Consequently, the operation history information M317 can be read out by an external apparatus having a reader-writer function, such as the mobile apparatus M102. This allows the manufacturer to reproduce the failure on the basis of the error information, thereby facilitating the analysis of the malfunction.

In addition, the power source status of the terminal apparatus M101 is also stored in the near-field communication memory M215. Accordingly, the server apparatus M104 can operate in accordance with the status of the power source, when updating the terminal unit M201 on the basis of firmware update information received from the reader-writer apparatus.

For example, in order for the terminal apparatus M101 to receive a functional update, such as an addition of a recipe for the microwave oven, the power source of the terminal unit M201 has to be ON. In this case, the reader-writer apparatus can decide whether the firmware can be updated, simply by a one-touch operation that enables the reader-writer apparatus to read out the power source status of the terminal unit M201 stored in the near-field communication memory M215. Thus, storing the power source status of the terminal unit M201 in the near-field communication memory M215 allows the mobile apparatus M102 having the reader-writer function, as well as the server apparatus M104 capable of communicating with the mobile apparatus M102, to decide the power source status of the terminal unit M201, and to operate in accordance with the power source status.

For example, the server apparatus M104 can transmit an activation command to the terminal apparatus M101 through the mobile apparatus M102 in the case where the server apparatus M104 has decided that the firmware of the terminal apparatus M101 has to be upgraded and that the terminal unit M201 is in the sleep mode. In addition, in the case where the terminal apparatus M101 is disconnected from an outlet, the server apparatus M104 can cause the display unit M110 of the mobile apparatus M102 to display a message urging the user to plug in into the outlet.

Figure 5:
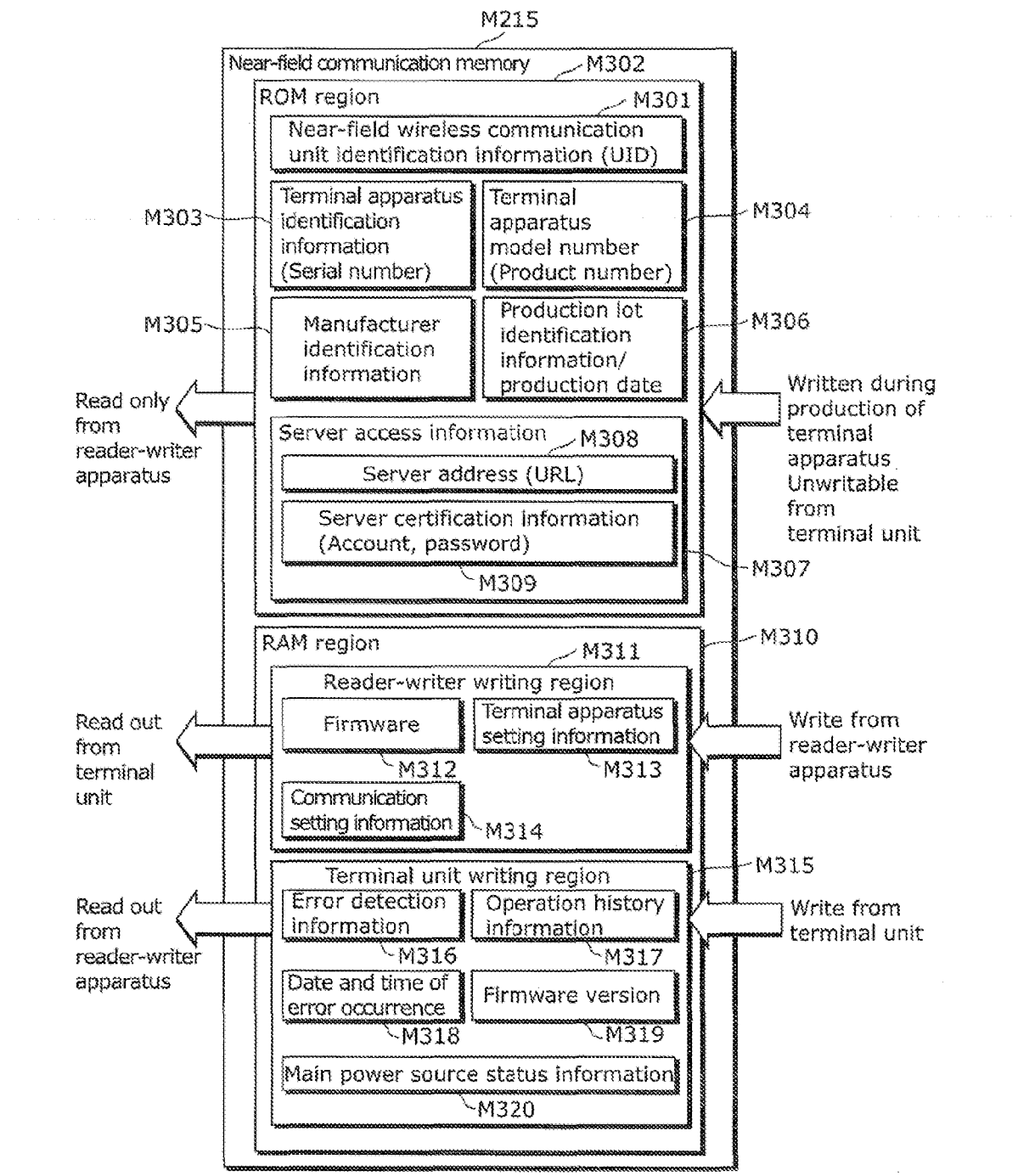
FIG. 5 is a schematic diagram showing information stored in a near-field communication memory according to the embodiment of the present invention.

FIG. 5 is a schematic diagram showing information stored in the near-field communication memory M215 of the near-field communication unit M107 of the terminal apparatus M101.

The near-field communication memory M215 includes the readable ROM region M302 and the updatable RAM region M310.

The ROM region M302 contains the near-field communication unit identification information (UID) M301 that enables the near-field communication unit M107 to be uniquely identified, terminal apparatus identification information (serial number) M303 written in the manufacturing process of the terminal apparatus M101, a terminal apparatus model number (product number) M304, manufacturer identification information M305, and production lot identification information and date of production M306. Upon transmitting the mentioned information from the terminal apparatus M101 to the server apparatus M104, the manufacturer becomes able to identify the terminal apparatus M101.

The ROM region M302 also contains server access information M307 which is necessary for the mobile apparatus M102 to transfer information acquired from the terminal apparatus M101 by near-field communication to the server apparatus M104. The server access information M307 contains a server address (URL) M308 and server authentication information (log-in account, password) M309. The server access information M307 is also recorded in the manufacturing process of the terminal apparatus M101. Such a configuration prevents terminal apparatus information recorded by a company A from being transferred to a server of another company B. To a company, information such as the user operation history of the company's product is quite valuable data that should not be leaked to another company. Accordingly, it is essential that the terminal apparatus M101 be properly connected to the server apparatus M104 pertinent to the terminal apparatus M101. This can be achieved by recording the server access information M307 in the near-field communication memory M215.

Further, as already stated, the data in the ROM region M302 is written in the manufacturing process of the terminal apparatus M101. Here, the ROM region M302 may physically be constituted of a rewritable flash memory or the like. In this case, however, the ROM region M302 is managed as a read-only region by the reader-writer apparatus mounted in the mobile apparatus M102. Such an arrangement prevents malicious operations such as spoofing by illegally rewriting the identification information, falsification of the server access information, and so forth, thereby upgrading the security level.

On the other hand, the updatable RAM region M310 contains a reader-writer writing region M311 that only accepts writing from the reader-writer apparatus mounted in the mobile apparatus M102, and a terminal unit writing region M315 that only accepts writing from the terminal unit M201 of the terminal apparatus M101.

The reader-writer writing region M311 includes a firmware region, a terminal apparatus setting information region, and a communication setting information region. In the firmware region, firmware M312 of the terminal apparatus M101 that may be updated is recorded. In the terminal apparatus setting information region, terminal apparatus setting information M313 which is the setting information of the apparatus, such as recipe information for the microwave oven or cooking program for the rice cooker, is recorded. In the communication setting information region, communication setting information M314 (for example, WEP/WPA key for Wi-Fi) is recorded in the case where the terminal apparatus M101 is capable of communicating through a wide-use network (for example, Wi-Fi, Zegbee, and Eather) other than the near-field communication.

The terminal unit writing region M315 only accepts writing from the controller M105 of the terminal unit M201. The information stored in the main memory M106 is written in the terminal unit writing region M315.

The terminal unit writing region M315 includes an error detection information region, an error occurrence date and time region, an operation history information region, a firmware version region, and a main power source status information region where main power source status information M320 is recorded. In the error detection information region, the error detection information M316 representing the error detected by the error detection unit M204 of the terminal unit M201 is recorded. In the error occurrence date and time region, the date and time of error occurrence M318 is recorded. In the operation history information region, the operation history information M317 detected by the operation history detection unit M203 is recorded. In the firmware version region, firmware version M319 representing the version of the firmware recorded in the FW region of the main memory M106 of the terminal unit M201 is recorded. In the main power source status information region, the main power source status information M320 indicating the power source status detected by the power source detection unit M205 is recorded. The above-mentioned information is read out from the reader-writer apparatus mounted in the mobile apparatus M102, and transmitted to the server apparatus M104. Accordingly, the server apparatus M104 can decide whether the firmware has to be updated on the basis of the firmware version M319, and whether it is possible to update the firmware on the basis of the main power source status information M320.

Hereunder, a process to be performed by the controller M105 of the terminal unit M201 will be described.

Figure 6:
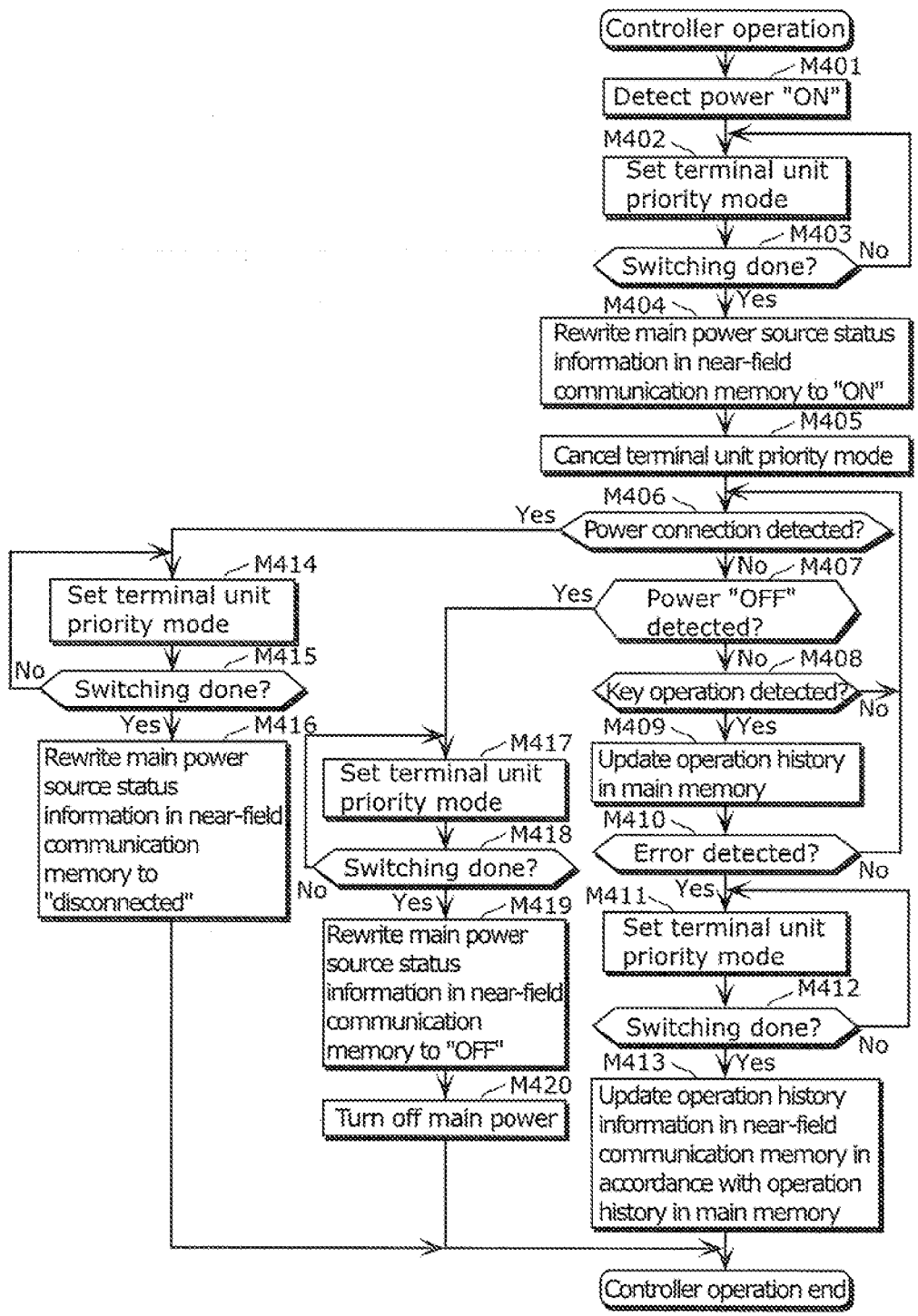
FIG. 6 is a flowchart showing a process performed by a controller according to the embodiment of the present invention.

FIG. 6 is a flowchart showing a process performed by the controller M105 of the terminal unit M201.

First, when the user turns on the power to the terminal apparatus M101, the power source detection unit M205 detects the power-on state on the basis of the voltage applied to the controller M105 (M401).

After the power source detection unit M205 has detected the power-on state, the controller M105 turns the switching unit M211 of the near-field communication unit M107 to a terminal unit priority mode, in which the access from the terminal unit M201 is accepted with priority (M402). Accordingly, the switching unit M211 switches the operation so as to drive the near-field communication memory M215 with the power source and clock supplied from the terminal unit M201. The switching unit M211 also outputs a switching completion signal to the controller M105, upon performing the switching.

Then the controller M105 decides whether switching has been performed by the switching unit M211 upon receipt of the switching completion signal from the switching unit M211 (M403). In the case where the switching has not been completed (No at M403), the controller M105 again sets the terminal unit priority mode (S402).

In the case where the switching has been completed (Yes at M403), the controller M105 rewrites the main power source status information M320 stored in the near-field communication memory to "ON" (M404).

Upon rewriting the main power source status information M320 in the near-field communication memory M215 at the step M404, the controller M105 cancels the terminal unit priority mode of the switching unit M211, turns the switching unit M211 to a reader-writer priority mode in which the access from the near-field communication unit M107 (reader-writer apparatus) to the near-field communication memory M215 is accepted with priority (M405).

Thus, in the case where the power disconnection detection unit M206 has decided that the power source for the controller M105 is ON at the step M401, the controller M105 rewrites the main power source status information M320 in the near-field communication memory M215 to ON through the terminal unit M201 after turning the switching unit M211 of the near-field communication unit M107 to the terminal unit priority mode, and then cancels the terminal unit priority mode.

After cancelling the terminal unit priority mode at the step M405, the controller M105 decides whether the power disconnection detection unit M206 has detected disconnection of the power source (M406).

In the case where disconnection of the power source has been detected (Yes at M406), the controller M105 performs the operation according to steps M414 to M416 utilizing the power stored in the power storage unit M208 of the main power source M207, and finishes the process.

At the step M414, the controller M105 turns the switching unit M211 of the near-field communication unit M107 to the terminal unit priority mode, as at the step M402.

At the step M415, the controller M105 decides whether the setting of the terminal unit priority mode has been completed. In the affirmative case (Yes at M415), the controller M105 rewrites the main power source status information M320 in the near-field communication memory M215 to "DISCONNECTED" (M416).

In contrast, in the case where disconnection of the power source has not been detected at the step M406 (No at M406), the controller M105 decides whether an operation of turning off the power to the controller M105 has been detected (M407). In the case where the operation of turning off has been detected (Yes at M407), the controller M105 performs the operation according to steps M417 to M420.

The step M417 is the same as the step M402, where the controller M105 turns the switching unit M211 of the near-field communication unit M107 to the terminal unit priority mode.

At the step M418, the controller M105 decides whether the setting of the terminal unit priority mode has been completed.

At the step M419, the controller M105 rewrites the main power source status information M320 in the near-field communication memory M215 to "OFF".

After rewriting the power source status to "OFF" at the step M419, the controller M105 turns off the power source of the terminal unit M201, thus finishing the operation of the system (M420).

Now, detailed description will be made regarding the power source status referred to in this embodiment. The state in which the power source is "ON" according to this embodiment means that the power source of the terminal unit M201 is ON and hence the terminal unit M201 is activated. The state in which the power source is "OFF" according to this embodiment means the state in which the system has been finished, however the power supply is not disconnected and hence the system can be activated by an operation of the user such as pressing a power-on button. The disconnection of the power source means such a state that the power cord is disconnected from an outlet or the battery has been removed. In other words, in the disconnection of the power source the system cannot be activated by a key manipulation of the user, unlike in the "OFF" state.

Although the steps M406 and M407 are incorporated in the system flow according to this embodiment, it is preferable that these steps be performed in a separate thread, triggered by a fluctuation of the power source status.

In the case where neither disconnection nor OFF state of the power source has been detected at the steps M406 and M407 (No at M407), the controller M105 decides whether the operation history detection unit M203 has detected a key manipulation of the user (M408). In the negative case (No at M408), the controller M105 returns to the operation of the step M406.

In the case where the key manipulation of the user has been detected at the step M408 (Yes at M408), the controller M105 updates the operation history information in the main memory M106 in accordance with the key manipulation detected (M409).

Then the controller M105 decides whether the error detection unit M204 has detected an error that has occurred in the terminal unit M201 in response to the key manipulation (M410). In the negative case (No at M410), the controller M105 returns to the operation of the step M406.

In the case where an error has been detected at the step M410 (Yes at M410), the controller M105 turns the switching unit M211 of the near-field communication unit M107 to the terminal unit priority mode (M411).

At a step M412, the controller M105 decides whether the setting of the terminal unit priority mode at the step M411 has been completed (M412). In the case where the switching has not been completed (No at M412), the controller M105 returns to the operation of the step M411.

In contrast, in the case where the switching has been completed (Yes at M412), the controller M105 updates operation history information M317 in the near-field communication memory M215 in accordance with the operation history information in the main memory M106 (M413), and finishes the process.

In this embodiment, therefore, the operation history information such as the key manipulation detected by the operation history detection unit M203 is once accumulated in the main memory M106. The operation history information accumulated in the main memory M106 at the time that the error detection unit M204 has detected an error is written in the near-field communication memory M215 together with error identification information. In the case where a memory region in the near-field communication memory M215 for storing the operation history information M317 is smaller than the operation history information accumulated in the main memory M106, the controller M105 selects the latest operation history information with respect to the timing at which the error has been detected, and stores only the selected operation history information in the near-field communication memory M215.

In the near-field communication memory M215, therefore, the operation history corresponding to several steps that lead to the detection of the error is accumulated. In addition, the near-field communication memory M215 can be read by the external reader-writer apparatus by near-field communication, even when the terminal unit M201 is not activated. Accordingly, even though the terminal unit M201 is disabled from being turned on owing to the error, the several steps of operation history information can be read out by an external apparatus. Such an arrangement allows reduction of a cost loss originating from impossibility to reproduce the failure at a repair shop. This is because the impossibility to reproduce the failure is an issue that arises in the case where the operation history leading to the error is unknown, and therefore the configuration according to this embodiment that allows several steps of operation history information to be read out by an external apparatus significantly minimizes the foregoing problem.

Figure 7:
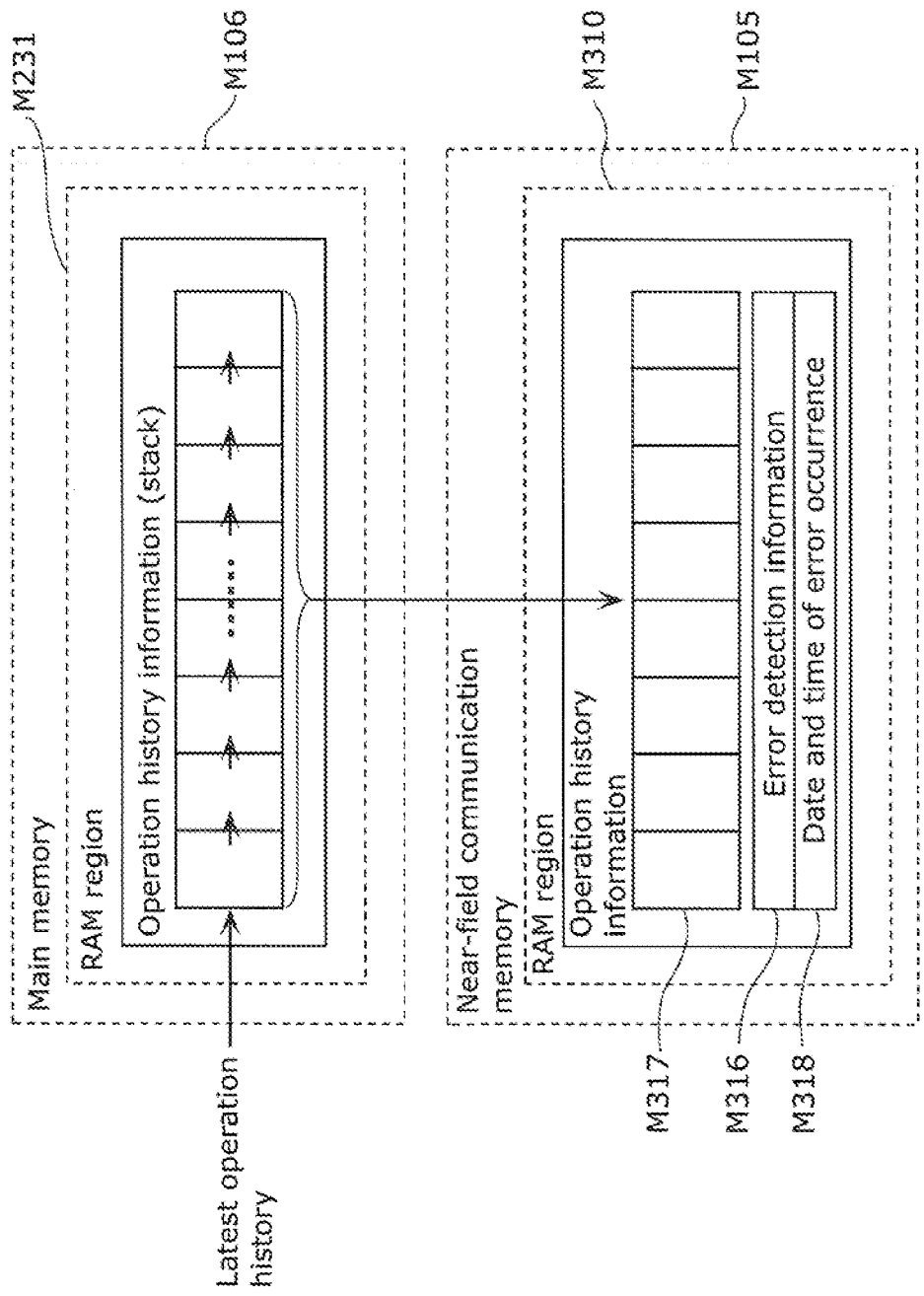
FIG. 7 is a schematic diagram showing a concept of an updating operation of operation history information in a main memory and near-field communication memory, according to the embodiment of the present invention.

FIG. 7 is a schematic diagram showing a concept of the updating operation of the operation history information in the main memory M106 and the near-field communication memory M215.

The operation history information in the main memory M106 is stored in the RAM region M231 of the main memory M106. The main memory M106 has a stack configuration that deletes the earliest one of the history information accumulated therein each time an operation such as the key manipulation of the user is performed, and stores the latest history information.

On the other hand, the near-field communication memory M215 stores the operation history information M317 in the RAM region M310 provided therein. In addition, the operation history information stored in the main memory M106 is duplicated in the near-field communication memory M215, when the error detection unit M204 detects an error. Further, the operation history information M317 is stored in the near-field communication memory M215 in association as with the error detection information M316 and the date and time of error occurrence M318 to be used for identifying the error that has occurred.

Such a configuration enables the operation history information M317 leading to the error to be read out, by reading the content of the near-field communication memory M215 by the external reader-writer apparatus by near-field communication. In addition, the issue of the impossibility to reproduce the failure can be solved and the critical information for performing the repair work can be read out simply by a one-touch operation.

The controller M105 confirms the storage capacity of the near-field communication memory M215 when the error detection unit M204 detects a malfunction of the terminal unit M201, and determines the capacity for the operation history information to be stored in the near-field communication memory M215. For example, the controller M105 confirms the capacity of the operation history information region where the operation history information M317 is to be stored, available in the RAM region M310 of the near-field communication memory M215. Then the controller M105 determines the capacity for the operation history information to be stored in the near-field communication memory M215 at a value equal to or smaller than the confirmed capacity.

It is preferable that, after the near-field communication unit M107 has transmitted the operation history information M317 stored in the near-field communication memory M215 to the mobile apparatus M102 through the antenna M108, the near-field communication memory M215 delete the operation history information M317 that has been transmitted, in order to prevent a duplicated reading. Alternatively, a flag indicating that the transmission has been performed may be added to the operation history information M317 that has been transmitted, which provides the same effect. In the latter case, the external reader-writer apparatus may select the operation history information M317 to be read out in accordance with the content represented by the flag.

The main memory M106 stores therein the operation history information generated with respect to each operation of the user, in a wraparound addressing mode. In the wraparound mode, the operation history information is accumulated in incremented addresses while the main memory M106 has a vacant region. When the address reaches the maximum storable value of the main memory M106, the address is initialized (numbered as 0, placed at the head), and new operation history information is overwritten on earlier one originally stored. Such a configuration allows the main memory M106 to surely store the latest operation history information essential for malfunction analysis, by deleting the earlier operation history information which is no longer useful for the malfunction analysis.

In addition, the main memory M106 contains the address position where the latest operation history information is recorded, in other words the address position of the operation history information recorded last in the main memory M106. Once the error detection unit M204 has detected a malfunction of the terminal unit M201, the controller M105 selects the operation history information in the main memory M106 by using the address position as reference and stores such operation history information in the near-field communication memory M215. Thus, the controller M105 stores the operation history information corresponding to the time point at which the malfunction has occurred the near-field communication memory M215, upon the occurrence of the malfunction. Such an arrangement facilitates the malfunction analysis.

Further, the near-field communication memory M215 deletes the operation history information that has been transmitted to the external reader-writer apparatus. Accordingly, a region for accumulating new operation history information upon occurrence of an additional malfunction can be secured, which leads to efficient utilization of the limited memory capacity.

Figure 8:
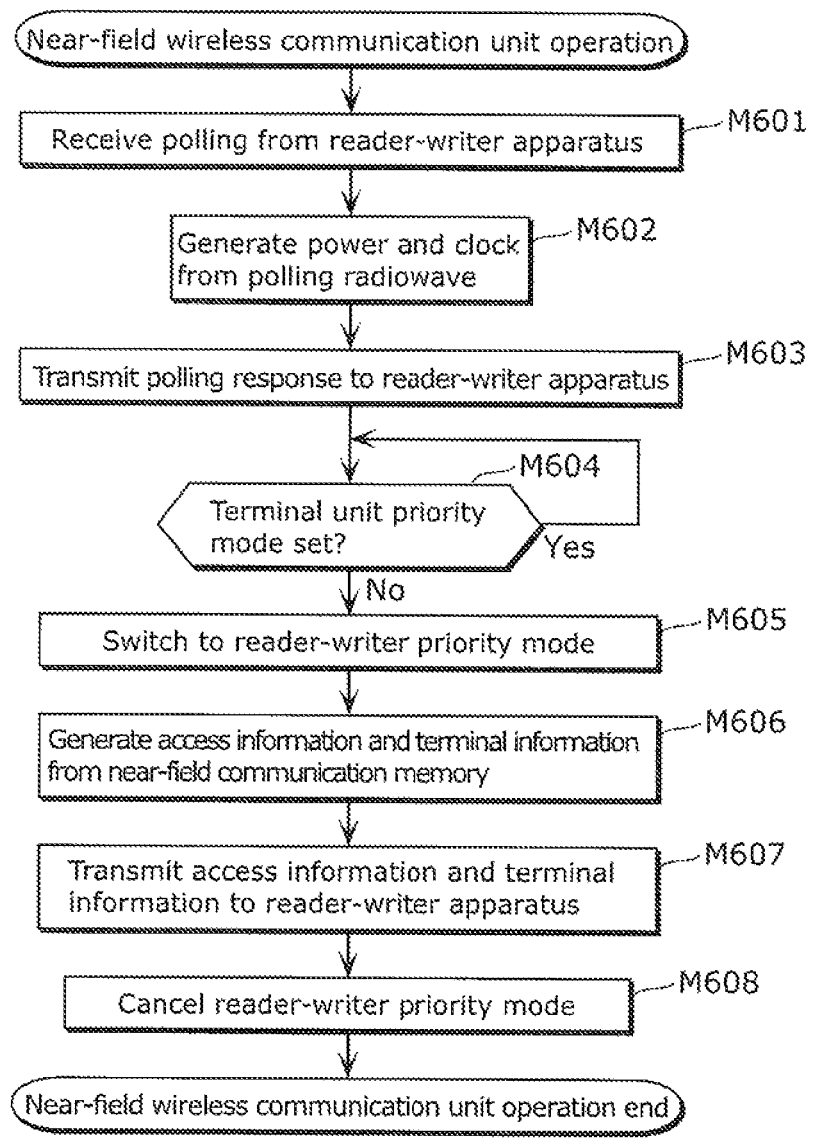
FIG. 8 is a flowchart showing a communication process performed by a near-field communication unit with an external reader-writer apparatus, according to the embodiment of the present invention.

FIG. 8 is a flowchart showing a communication process performed by the near-field communication unit M107 with the external reader-writer apparatus.

First, the near-field communication unit M107 receives radiowave for polling, being outputted from the reader-writer apparatus to unspecified parties, through the antenna M108 (M601).

Upon receipt of the radiowave for polling, the power source generation unit M219 and the clock generation unit M220 generate the power and clock signal for activating the near-field communication unit M107, on the basis of the radiowave for polling (M602).

When the power and clock are generated, the near-field communication unit M107 activates the system thereof and returns a polling response to the external reader-writer apparatus outputting the radiowave for polling (M603).

Then the near-field communication unit M107 decides whether the switching unit M211 is set at the terminal unit priority mode (M604). In the case where the switching unit M211 is set at the terminal unit priority mode (Yes at M604), the terminal unit M201 is making access to the near-field communication memory M215, and hence the near-field communication unit M107 stands by while the terminal unit priority mode is effective.

In contrast, in the case where the switching unit M211 is not set at the terminal unit priority mode (No at M604), the near-field communication unit M107 turns the switching unit M211 to the reader-writer priority mode (M605).

The near-field communication unit M107 then generates access information and terminal information to be transmitted to the reader-writer apparatus on the basis of the information stored in the near-field communication memory M215 (M606).

The near-field communication unit M107 transmits the generated access information and terminal information to the reader-writer apparatus (M607). As a matter of course, the near-field communication unit M107 transfers such information in accordance with a read command from the reader-writer apparatus.

Upon completing the transmission, the near-field communication unit M107 cancels the reader-writer priority mode set by the switching unit M211, and finishes the near-field communication process (M608).

Figure 9:
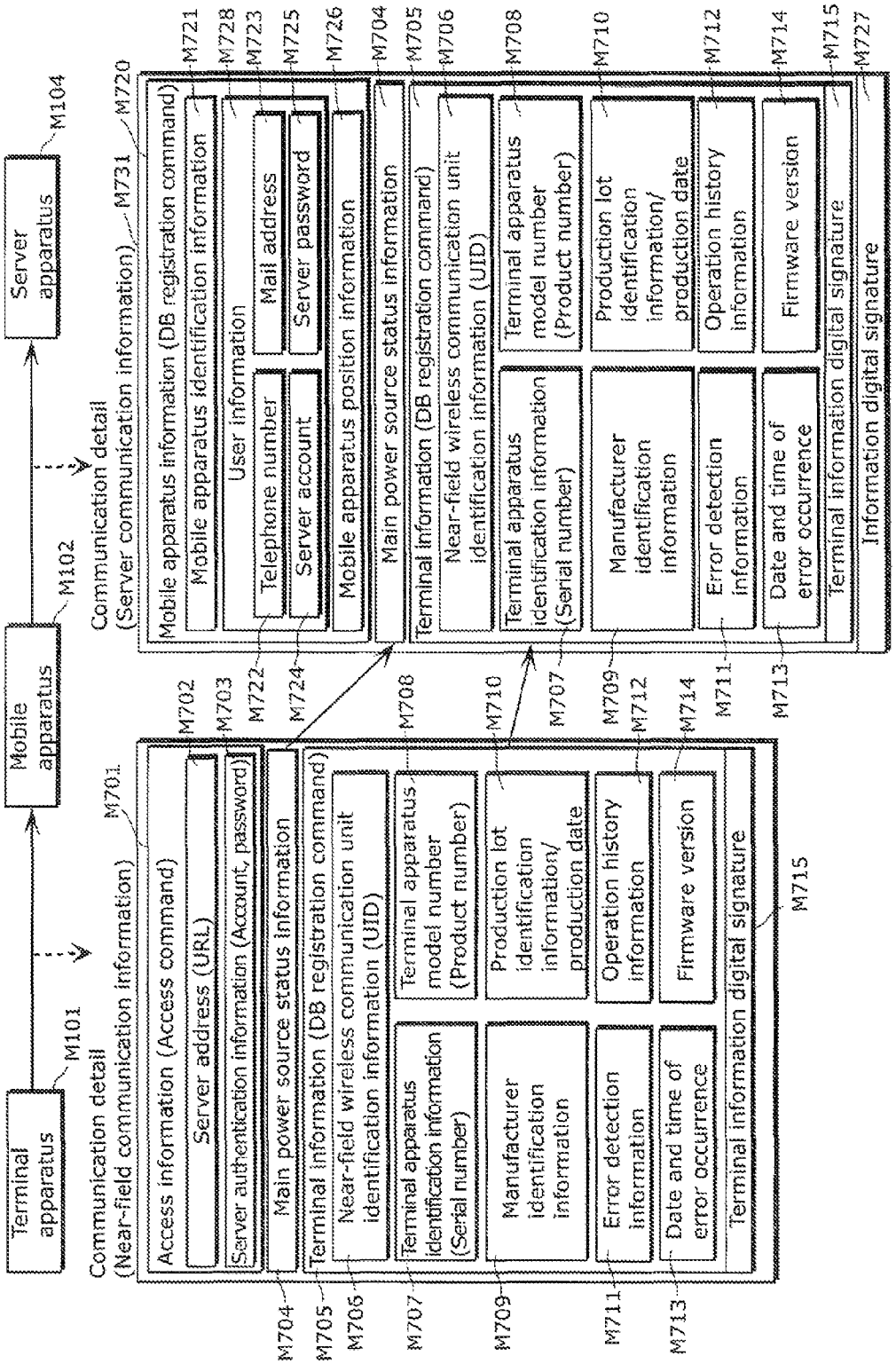
FIG. 9 is a schematic diagram showing communication information between constituents generated upon bringing a mobile apparatus into touch with the terminal apparatus in the communication system according to the embodiment of the present invention.

FIG. 9 is a schematic diagram showing communication information between the constituents generated upon bringing the mobile apparatus M102 into touch with the terminal apparatus M101 in the communication system M100 according to this embodiment.

When the mobile apparatus M102 is made to touch the terminal apparatus M101, the terminal apparatus M101 generates access information M701, main power source status information M704, and terminal information M705 on the basis of the content stored in the near-field communication memory M215 by near-field communication. The terminal apparatus M101 transmits the generated access information M701, the main power source status information M704, and the terminal information M705 to the mobile apparatus M102, in accordance with the read command from the mobile apparatus M102.

The access information M701 is necessary for establishing connection between the mobile apparatus M102 and the server apparatus M104. The access information M701 contains a server address M702 and server authentication information M703.

The server address M702 contains a uniform resource locator (URL) which is the address information of the server apparatus M104. The server authentication information M703 includes authentication information for logging in into the server apparatus M104. The access information M701 corresponds to the server access information M307 stored in the ROM region M302 of the near-field communication memory M215. Here, the access information M701 may be generated as an access command containing the server address M702 and the server authentication information M703, for the server apparatus M104.

The main power source status information M704 is flag information indicating the power source status of the terminal unit M201 of the terminal apparatus M101. The main power source status information M704 is generated in accordance with the main power source status information M320 stored in the terminal unit writing is region M315 in the RAM region M310 of the near-field communication memory M215. The main power source status information M704 indicates one of at least "ON", "OFF", and "DISCONNECTED", as the power source status. For example, the main power source status information M704 may represent the same content as that of the main power source status information M320.

The terminal information M705 is transmitted to the server apparatus M104 through the mobile apparatus M102, and registered in the database of the server apparatus M104. The terminal information M705 contains near-field communication unit identification information M706, terminal apparatus identification information M707, a terminal apparatus model number M708, manufacturer identification information M709, production lot identification information and date of production M710, error detection information M711, operation history information M712, a date and time of error occurrence M713, and a firmware version M714. In addition, the terminal information M705 is assigned with a terminal information digital signature M715 which is the signature information of the terminal information M705 as a whole.

The near-field communication unit identification information M706 is the identification information that allows the near-field communication unit M107 of the terminal apparatus M101 to be uniquely identified. The near-field communication unit identification information M706 is generated on the basis of the near-field communication unit identification information M301 stored in the near-field communication memory M215. For example, the near-field communication unit identification information M706 may represent the same content as that of the near-field communication unit identification information M301.

The terminal apparatus identification information M707 contains, for example, the serial number of the terminal apparatus M101 for identification thereof. The terminal apparatus identification information M707 is generated on the basis of the terminal apparatus identification information M303 stored in the near-field communication memory M215. Thus, the terminal apparatus identification information M707 may represent the same content as that of the terminal apparatus identification information M303.

The terminal apparatus model number M708 indicates the model number or product number of the terminal apparatus M101, and is generated on the basis of the terminal apparatus model number M304 stored in the near-field communication memory M215. The terminal apparatus model number M708 may represent, for example, the same content as that of the terminal apparatus model number M304.

The manufacturer identification information M709 is employed for identifying the manufacturer of the terminal apparatus M101, and generated on the basis of the manufacturer identification information M305 stored in the near-field communication memory M215. The manufacturer identification information M709 may represent, for example, the same content as that of the manufacturer identification as information M305.

The production lot identification information and date of production M710 is employed for identifying the production lot number and the date of production of the terminal apparatus M101, and generated on the basis of the production lot identification information and date of production M306 stored in the near-field communication memory M215. The production lot identification information and date of production M710 may represent, for example, the same content as that of the production lot identification information and date of production M306.

The error detection information M711 is employed for identifying the error detected by the error detection unit M204, and generated on the basis of the error detection information M316 stored in the terminal unit writing region M315 of the near-field communication memory M215. The error detection information M711 may represent, for example, the same content as that of the error detection information M316.

The operation history information M712 is generated on the basis of the operation history information M317 stored in the near-field communication memory M215 by copying the operation history information stored in the main memory M106 at the timing at which the error detection unit M204 has detected an error. The operation history information M712 may represent, for example, the same content as that of the operation history information M317.

The date and time of error occurrence M713 indicates the date and time at which the error detection unit M204 has detected an error, and is generated on the basis of the date and time of error occurrence M318 stored in the near-field communication memory M215. The date and time of error occurrence M713 may represent, for example, the same content as that of the date and time of error occurrence M318.

The firmware version M714 is the version information of the firmware of the terminal apparatus M101, and generated on the basis of the firmware version M319 written in the near-field communication memory M215 by the controller M105. The firmware version M714 may represent, for example, the same content as that of the firmware version M319.

The terminal information M705 is assigned with the terminal information digital signature M715 employed for preventing to falsification of the communication path and information by an unauthorized mobile apparatus. For example, a popular secret key cryptography or public key cryptography may be employed as the algorithm of the terminal information digital signature M715.

The respective information elements of the terminal information M705, namely the near-field communication unit identification information M706, the terminal apparatus identification information M707, the terminal apparatus model number M708, the manufacturer identification information M709, the production lot identification information and date of production M710, the error detection information M711, the operation history information M712, the date and time of error occurrence M713, and the firmware version M714, may be configured in a format of database registration command to be transmitted to the server apparatus M104 through the mobile apparatus M102.

The mobile apparatus M102 transmits the mobile apparatus information M720, the main power source status information M704, and the terminal information M705 to the server apparatus M104 through the Internet or mobile phone communication network, on the basis of the access information M701 and the terminal information M705 read out from the terminal apparatus M101 by near-field communication.

More specifically, the mobile apparatus M102 reads out the address information and the authentication information of the server apparatus M104 from the access information M701 transmitted from the terminal apparatus M101, to thereby establish connection to the server apparatus M104. In addition, the mobile apparatus M102 adds the mobile apparatus information M720 to the terminal information M705 transmitted from the terminal apparatus M101, to thereby generate the data to be transmitted to the server apparatus M104.

The mobile apparatus information M720 is generated on the basis of the information stored in the mobile apparatus M102. The mobile apparatus information M720 contains mobile apparatus identification information M721, user information M728, and mobile apparatus position information M726. The user information M728 contains a telephone number M722, a mail address M723, a server account M724, and a server password M725.

The mobile apparatus identification information M721 is the identification information that allows the mobile apparatus M102 to be uniquely identified, for example the identification information of the mobile terminal or of the subscriber identity module (SIM), in the case where the mobile apparatus M102 is a mobile phone.

The telephone number M722 is the telephone number assigned to the mobile apparatus M102.

Likewise, the mail address M723 is the mail address assigned to the mobile apparatus M102.

The server account M724 is the account information for establishing connection to the server apparatus M104.

The server password M725 is the password for establishing connection to the server apparatus M104.

The mobile apparatus position information M726 is position information extracted by a positioning device incorporated in the mobile apparatus M102. For example, the mobile apparatus position information M726 may be position information acquired through the global positioning system (GPS), or position information calculated on the basis of a distance from a mobile base station. The mobile apparatus position information M726 is acquired by the mobile apparatus M102 upon being made to touch the terminal apparatus M101 so as to establish the near-field communication. Since the communication range of the near-field communication is normally tens of centimeters, the position information of the mobile apparatus M102 may be construed as the position information of the terminal apparatus M101 being touched by the mobile apparatus M102.

The respective elements of the mobile apparatus information M720, namely the mobile apparatus identification information M721, the telephone number M722, the mail address M723, the server account M724, the server password M725, and the mobile apparatus position information M726 may be configured in a format of database registration command to be transmitted to the server apparatus M104.

The mobile apparatus M102 transmits server communication information M731 containing the main power source status information M704 and the terminal information M705 transmitted from the terminal apparatus M101 to the server apparatus M104, without any change. In addition, the server communication information M731 transmitted from the mobile apparatus M102 to the server apparatus M104 is assigned with a digital signature M727, which is digital signature information that serves to prevent falsification during the transmission.

It is preferable that the terminal information M705 transmitted from the terminal apparatus M101 to the mobile apparatus M102 by encrypted in the terminal apparatus M101. It is preferable that the encryption can only be decoded by the server apparatus M104, and not by the mobile apparatus M102. This is because the terminal information M705 can be transmitted as information that can only be decoded by the legitimate server apparatus M104, despite presence of a malicious mobile apparatus M102 attempting to transmit critical terminal apparatus information to an illegitimate server for analysis. Such a configuration protects the terminal apparatus information from such an unauthorized action.

Figure 10:
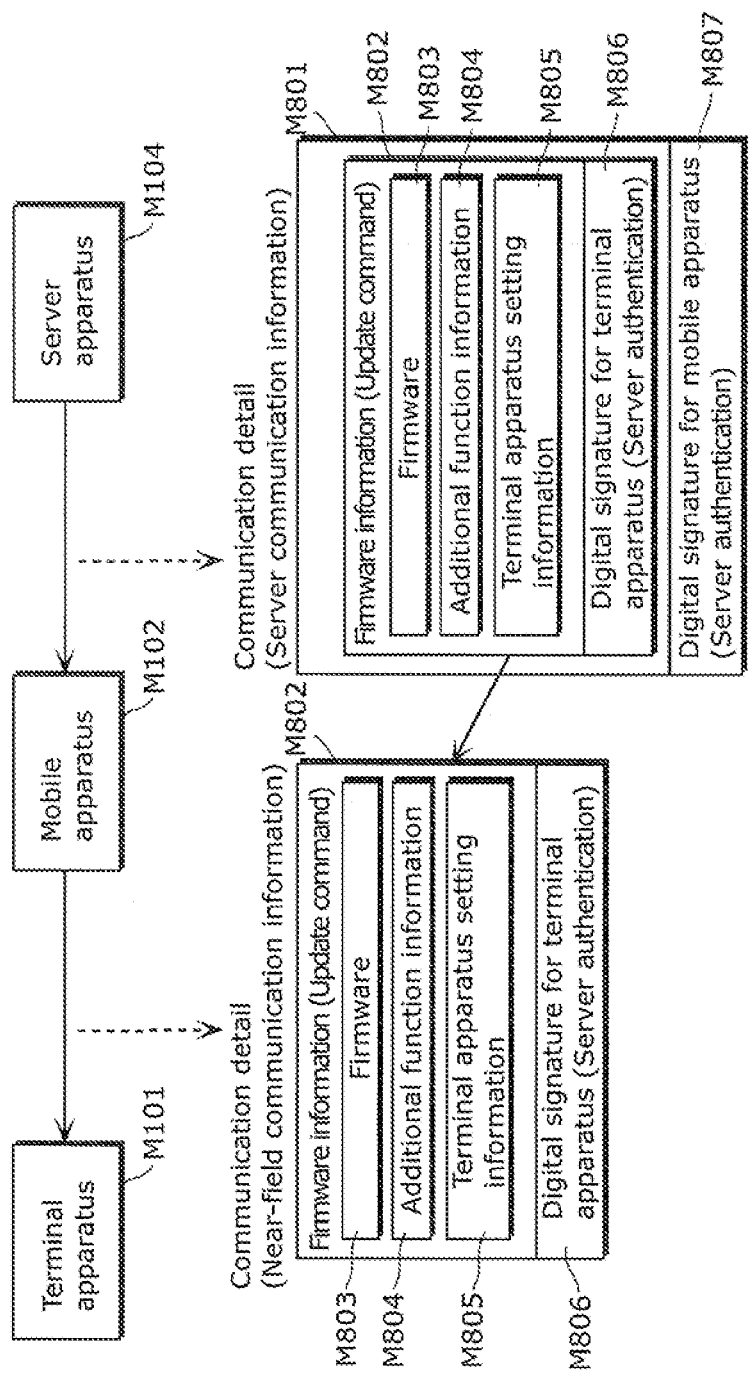
FIG. 10 is a schematic diagram showing contents of the communication information transmitted from a server apparatus to the terminal apparatus through the mobile apparatus, in the communication system according to the embodiment of the present invention.

FIG. 10 is a schematic diagram showing contents of the communication information transmitted from the server apparatus M104 to the terminal apparatus M101 through the mobile apparatus M102. Normally, the server apparatus M104 transmits information after the terminal apparatus M101 has transmitted information to the server apparatus M104 through the mobile apparatus M102 as shown in FIG. 9.

The server apparatus M104 registers the terminal information M705 in the database in association with the mobile apparatus information M720, upon receipt of the terminal information M705 and the mobile apparatus information M720 from the mobile apparatus M102. At the same time, the server apparatus M104 checks the firmware version M714 of the terminal information M705 and decides whether it is necessary to update the firmware of the terminal apparatus M101. In the affirmative case, the server apparatus M104 transmits new firmware and additional function information, or terminal apparatus setting information to the terminal apparatus M101 through the mobile apparatus M102. That is how the server apparatus M104 upgrades the firmware version for the terminal apparatus M101.

The information transmitted from the server apparatus M104 to the mobile apparatus M102 (server communication information M801) includes firmware information M802. The server communication information M801 contains two types of signature information, namely a digital signature for terminal apparatus M806 and a digital signature for mobile apparatus M807.

The firmware information M802 contains firmware M803, additional function information M804, and terminal apparatus setting information M805.

The firmware M803 is the firmware itself to be updated in the terminal apparatus M101.

The additional function information M804 is software implemented with an additional function for the terminal apparatus M101, such as an additional recipe for the microwave oven.

The terminal apparatus setting information M805 is software for automating the setting of the terminal apparatus M101, for example with respect to the cooking program for the electronic rice cooker.

The digital signature for mobile apparatus M807 allows the mobile apparatus M102 to decide whether the server communication information M801 has not been falsified. The digital signature for mobile apparatus M807 is generated, for example, between the server apparatus M104 and the mobile apparatus M102 by using secret key cryptography.

The digital signature for terminal apparatus M806 allows the terminal apparatus M101 to decide whether the firmware information M802 has not been falsified. The digital signature for terminal apparatus M806 is generated, for example, between the server apparatus M104 and the terminal apparatus M101 by using secret key cryptography.

The digital signature for mobile apparatus M807 is assigned mainly for deciding whether the server communication information M801 has not been falsified in the communication path between the server apparatus M104 and the mobile apparatus M102. On the other hand, the digital signature for terminal apparatus M806 is assigned for deciding whether the firmware information M802 has not been falsified by a malicious mobile apparatus M102.

Regarding the update of the firmware, in particular, falsification by a malicious party such as insertion of a firing program in the firmware may lead to a serious accident. In this embodiment, therefore, two types of digital signatures are employed for confirming whether the communication path and the mobile apparatus M102 are authentic ones. Here, although the digital signature has been described in this embodiment, the information itself may be encrypted, and the mobile apparatus M102 may decode the server communication information M801 and the terminal apparatus M101 may decode the firmware information M802. Such an arrangement also provides the same advantage.

Further, the mobile apparatus M102 confirms the digital signature for mobile apparatus M807 to thereby decide whether the received server communication information M801 has not been falsified, and transmits, only when the information is authentic, the firmware information M802 and the digital signature for terminal apparatus M806 to the terminal apparatus M101 through the by near-field communication.

Here, since the mobile apparatus M102 has to be made to touch the terminal apparatus M101 by the user in order to establish the near-field communication, it is preferable that the display unit M110 of the mobile apparatus M102 display a message urging the user to bring the mobile apparatus M102 into touch with the terminal apparatus M101, at the timing at which the authentication of the digital signature for mobile apparatus M807 has been completed.

When the mobile apparatus M102 is made to touch the terminal apparatus M101, the mobile apparatus M102 transmits the firmware information M802 to the terminal apparatus M101 by near-field communication. Then the terminal apparatus M101 checks the digital signature for terminal apparatus M806 to thereby decide whether the firmware information M802 has not been falsified. Only when the information is authentic, the terminal apparatus M101 updates the firmware by using the firmware M803; adds a function to the terminal apparatus M101 by using the additional function information M804; or assigns a function to the key of the terminal apparatus M101 by using the terminal apparatus setting information M805.

As described above, utilizing the near-field communication, which is inexpensive and intuitively usable, allows the terminal apparatus M101 to undergo the firmware version upgrade and functional improvement, despite not being involved in a wide-use network such as the Internet. Accordingly, the terminal apparatus M101 can be implemented with an optimum setting that fits each user's operating feeling. In addition, the server apparatus M104 can generate setting information for the terminal apparatus M101 that is optimum to the user on the basis of the operation history information acquired by near-field communication. Thus, the terminal apparatus M101 can be optimized for each individual user.

Figure 11:
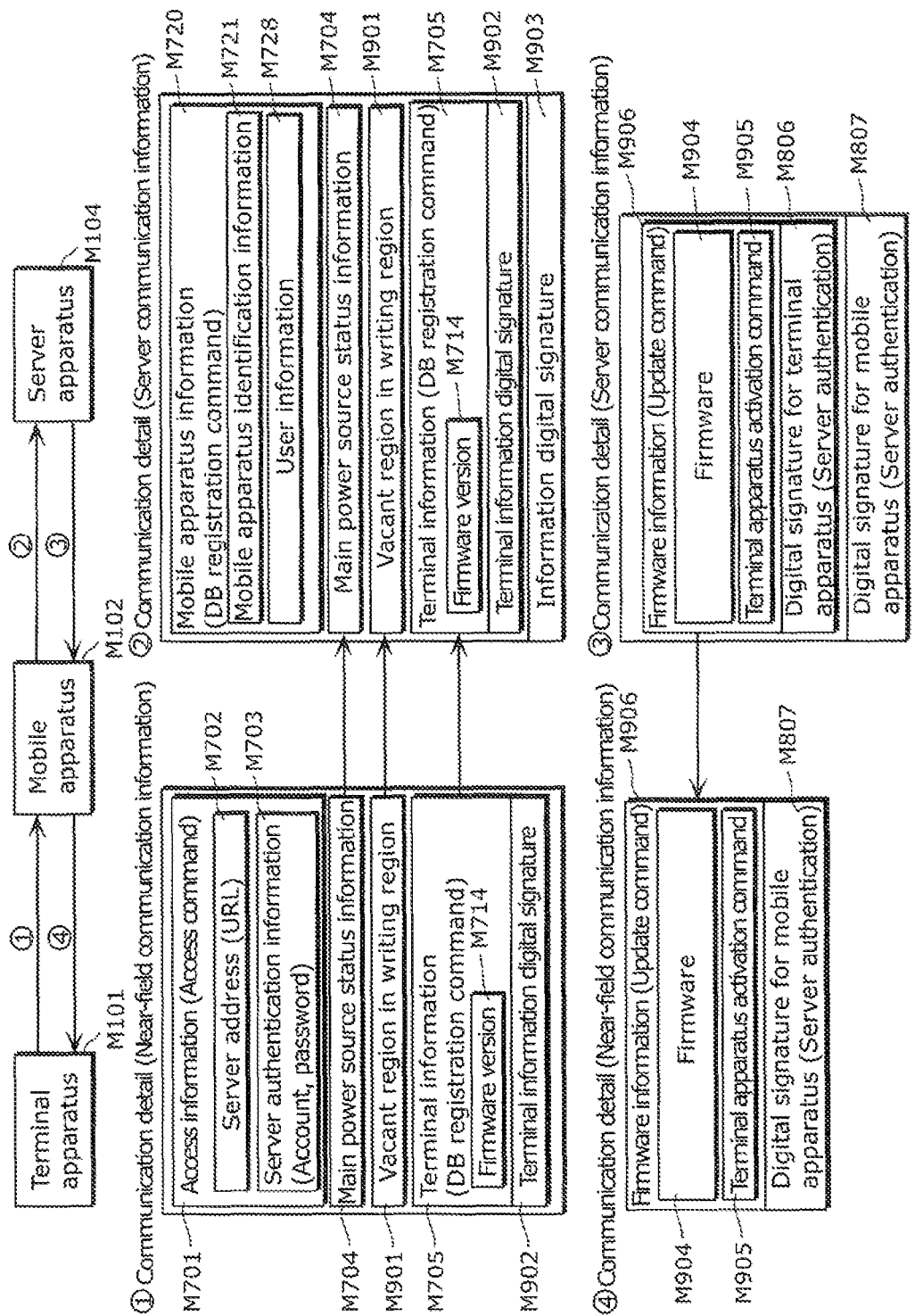
FIG. 11 is a schematic diagram showing contents of the communication information for updating firmware of the terminal apparatus by bringing the mobile apparatus into touch with the terminal apparatus, in the communication system according to the embodiment of the present invention.

FIG. 11 is a schematic diagram similar to FIG. 10, showing contents of the communication information for updating the firmware of the terminal apparatus M101 by bringing the mobile apparatus M102 into touch with the terminal apparatus M101. However, FIG. 11 is different from FIG. 10 in that the power source status of the terminal apparatus M101 is "OFF".

First, when the mobile apparatus M102 is made to touch the terminal apparatus M101, the terminal apparatus M101 transmits the access information M701, the main power source status information M704, a vacant region in writing region M901, the terminal information M705, and a terminal information digital signature M902, to the mobile apparatus M102.

The vacant region in writing region M901 indicates an unused capacity where data can be written, in the RAM region M310 of the near-field communication memory M215.

The terminal information digital signature M902 is the digital signature information of the terminal information M705, and generated in the terminal apparatus M101.

The mobile apparatus M102 establishes connection to the server apparatus M104 on the basis of the access information M701 transmitted from the terminal apparatus M101. Then the mobile apparatus M102 adds the mobile apparatus information M720 to the main power source status information M704, the vacant region in writing region M901, and the terminal information M705 received from the terminal apparatus M101, and transmits the mentioned information to the server apparatus M104.

In addition, the mobile apparatus M102 generates a digital signature M903 representing the digital signature information of the mobile apparatus M102, and adds the digital signature M903 to the mobile apparatus information M720, the main power source status information M704, the vacant region in writing region M901 and the terminal information M705, and transmits the mentioned information to the server apparatus M104.

The server apparatus M104 checks the digital signature M903 assigned by the mobile apparatus M102, as well as the terminal information digital signature M902 assigned by the terminal apparatus M101. The server apparatus M104 registers the terminal information M705 in the database in association with the mobile apparatus information M720, in the case the digital signature M903 and the terminal information digital signature M902 are both confirmed to be authentic.

The server apparatus M104 also decides whether to update the firmware on the basis of the firmware version M714 contained in the terminal information M705. In the case where the firmware is to be updated, the server apparatus M104 transmits the corresponding firmware M904 to the terminal apparatus M101 through the mobile apparatus M102.

Further, the server apparatus M104 decides whether it is possible to update the firmware in the terminal apparatus M101, on the basis of the main power source status information M704. More specifically, in the case where the main power source status information M704 indicates that the power source status is "ON" the firmware can be updated, and therefore the server apparatus M104 transmits the firmware M904 to be updated to the terminal apparatus M101.

On the other hand, in the case where the power source status is "OFF" the firmware can be updated upon activating the power source, and therefore the server apparatus M104 transmits the firmware M904 for updating and the terminal apparatus activation command M905 to the terminal apparatus M101 through the mobile apparatus M102.

In the case where the power source status is "DISCONNECTED" it is impossible to update the firmware by transmitting the firmware M904 to the terminal apparatus M101. Accordingly, the server apparatus M104 transmits, to the mobile apparatus M102, an instruction to cause the display unit M110 to display a message urging the user to turn on the power source for the terminal apparatus M101 for updating the firmware.

Hereafter, description will be made on the assumption that the power source status of the terminal apparatus M101 is "OFF".

In the case where the server apparatus M104 has decided on the basis of the firmware version M714 that the firmware has to be updated; the power source status is "OFF"; and the vacant region in writing region M901 is sufficient for the size of the firmware to be updated, the server apparatus M104 transmits the firmware M904 for updating and the terminal apparatus activation command M905 to the mobile apparatus M102, as the firmware information M906.

When transmitting the firmware information M906 to the mobile apparatus M102, the server apparatus M104 adds the digital signature for terminal apparatus M806 that can be verified by the terminal apparatus M101 and the digital signature for mobile apparatus M807 that can be verified by the mobile apparatus M102 to the firmware information M906.

The mobile apparatus M102 checks the digital signature for mobile apparatus M807 contained in the information received, and transmits the firmware information M906 to the terminal apparatus M101 upon deciding that the information is authentic.

In the terminal apparatus M101, the near-field communication unit M107 outputs the activation command to the terminal unit M201 so as to activate the terminal unit M201. Then the terminal apparatus M101 updates the firmware on the basis of the firmware M904 received.

As described above, the terminal apparatus M101 transmits the main power source status information M704 and the vacant region in writing region M901 to the server apparatus M104. This enables the server apparatus M104 to decide whether it is possible for the terminal apparatus M101 to update the firmware. Therefore, the server apparatus M104 can cause the mobile apparatus M102 to display a message that fits the situation, and transmit the activation command to the terminal apparatus M101. Such an arrangement significantly alleviates the burden of operation on the user for updating the firmware.

FIGS. 12A to 12D are schematic drawings showing examples of the display on the mobile apparatus M102 for updating the firmware as described referring to FIGS. 9 to 11.

Figure 12A:
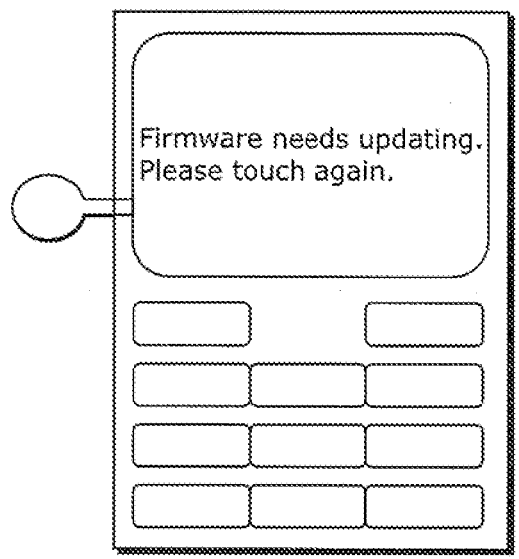
FIG. 12A is a schematic drawing showing an example of a display on the mobile apparatus for updating the firmware according to the embodiment of the present invention.

FIG. 12A represents the case where the power source status indicated by the main power source status information M704 is "ON", and shows a message displayed on the mobile apparatus M102 after the mobile apparatus M102 acquires the firmware from the server apparatus M104. The firmware stored in the mobile apparatus M102 can be transmitted to the terminal apparatus M101 so as to be updated, by bringing the mobile apparatus M102 into touch with the terminal apparatus M101 once again.

Figure 12B:
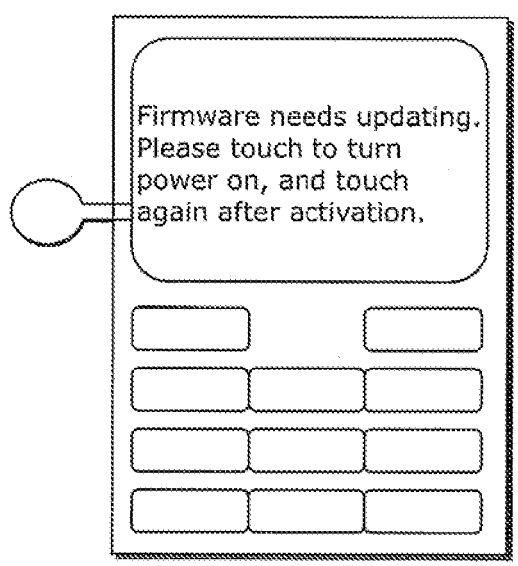
FIG. 12B is a schematic drawing showing another example of the display on the mobile apparatus for updating the firmware according to the embodiment of the present invention.

FIG. 12B shows a message displayed on the mobile apparatus M102 in the case where the power source status indicated by the main power source status information M704 is "OFF". In this case, the information transmitted from the server apparatus M104 includes the terminal apparatus activation command M905. Accordingly, the activation command is transferred from the mobile apparatus M102 to the terminal apparatus M101 so as to activate the terminal apparatus M101, by performing one touch. Then by another touch, the firmware is transferred from the mobile apparatus M102 to the terminal apparatus M101, so that the firmware is updated in the terminal apparatus M101. Here, this example represents the case where the capacity of the near-field communication memory M215 is not sufficient and hence the activation command and the firmware are separately transmitted by two touches. In the case where the near-field communication memory M215 has a sufficient capacity, the activation command and the firmware to be updated (update command) can be simultaneously transferred from the mobile apparatus M102 to the terminal apparatus M101. In this case, the terminal apparatus M101 is activated by the activation command, and then, updates the firmware.

Figure 12C:
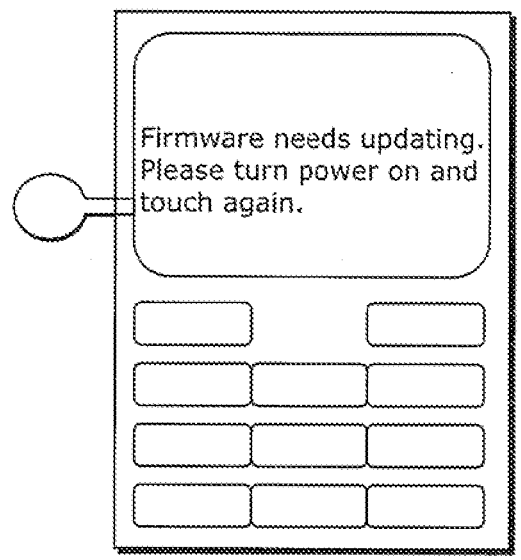
FIG. 12C is a schematic drawing showing still another example of the display on the mobile apparatus for updating the firmware according to the embodiment of the present invention.

FIG. 12C shows a message displayed on the mobile apparatus M102 in the case where the power source status indicated by the main power source status information M704 is "DISCONNECTED". In this case the user has to be instructed to turn on the power source, and hence the server apparatus M104 causes the display unit M110 of the mobile apparatus M102 to display the instruction to that effect.

Figure 12D:
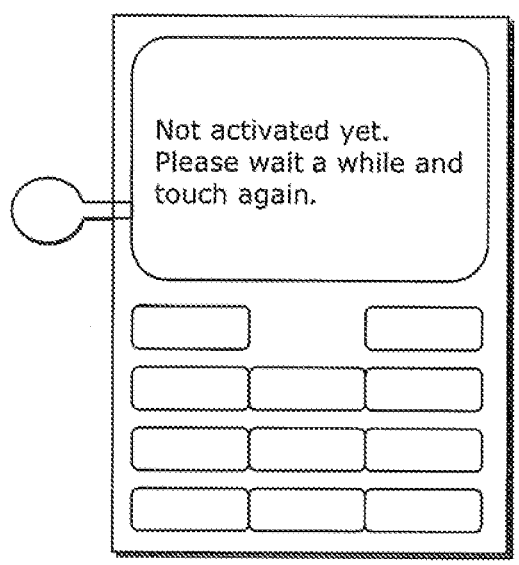
FIG. 12D is a schematic drawing showing still another example of the display on the mobile apparatus for updating the firmware according to the embodiment of the present invention.

FIG. 12D shows a message displayed in the case where the terminal apparatus M101 has not yet been activated despite that another touch has been performed after the message of FIG. 12B is displayed. If the terminal apparatus M101 has not been activated, the main power source status information M704 in the near-field communication memory M215 has not been updated but remains "OFF". The mobile apparatus M102 or the server apparatus M104 recognizes that the main power source status information M704 remains "OFF", and causes the display unit M110 of the mobile apparatus M102 to display the message as shown in FIG. 12D. Such an arrangement allows the firmware to be safely updated.

Figure 13:
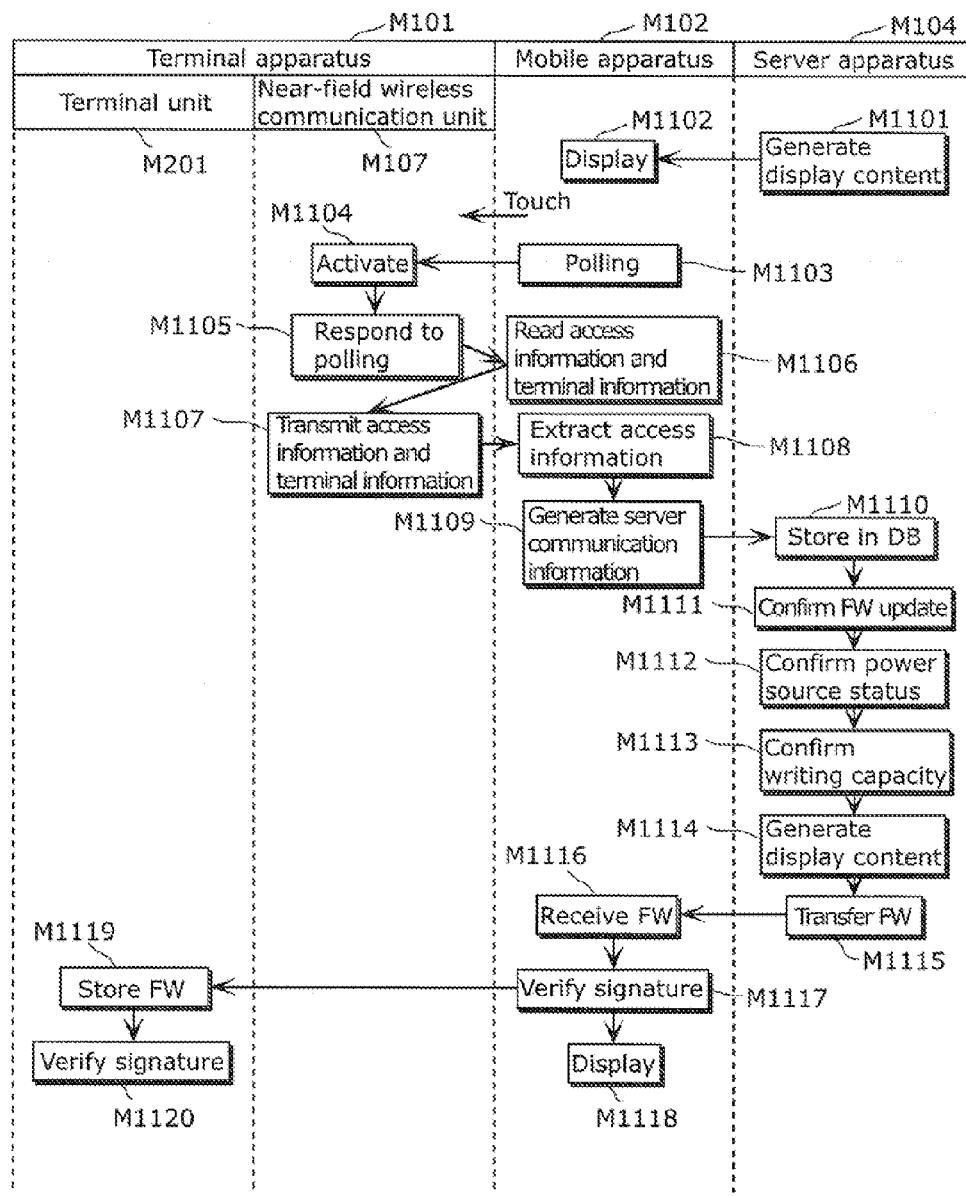
FIG. 13 is a sequence chart showing operation flows of the terminal apparatus, the mobile apparatus, and the server apparatus according to the embodiment of the present invention.

FIG. 13 is a sequence chart showing operation flows of the terminal apparatus M101, the mobile apparatus M102, and the server apparatus M104 according to this embodiment.

The server apparatus M104 contains therein the database, and is constantly deciding whether an update of the firmware or addition of the functional improvement program is to be performed with respect to the apparatuses registered in the database. The server apparatus M104 generates, upon deciding that an update of the firmware or addition of the functional improvement program is to be performed with respect to a specific apparatus, a message requesting the update of the firmware or addition of the functional improvement program (M1101). This message is to be displayed on the display unit M110 of the mobile apparatus M102, and may be in a form of either a pop-up message appearing in the display unit M110 or an e-mail. Such an arrangement allows the user who owns the specific apparatus to be updated to be urged to perform the update.

Upon receipt of the message, the mobile apparatus M102 displays the received message on the display unit M110 (M1102).

The user activates, upon confirming the message, an application for activating the reader-writer apparatus in the mobile apparatus M102 that performs the near-field communication, and causes the reader-writer apparatus to start polling (M1103).

Then the user brings the mobile apparatus M102 performing the polling into touch with the specific terminal apparatus M101 that has to be updated at a region thereof where the antenna M108 is mounted. When the touch is made, the near-field communication unit M107 of the terminal apparatus M101 receives the radiowave from the mobile apparatus M102 through the antenna M108, and generates the power and clock signal necessary for driving at least the near-field communication unit M107 of the terminal apparatus M101, from the electric field provided by the mobile apparatus M102. Then the terminal apparatus M101 activates the near-field communication unit M107 (M1104).

Upon being activated, the near-field communication unit M107 transmits a polling response signal to the mobile apparatus M102 (M1105). At this point, the near-field communication is established between the terminal apparatus M101 and the mobile apparatus M102.

The mobile apparatus M102 generates a command for reading the access information and the terminal information from the near-field communication memory M215 of the terminal apparatus M101 upon receipt of the polling response signal from the terminal apparatus M101, and transmits the command to the terminal apparatus M101 (M1106).

The near-field communication unit M107 of the terminal apparatus M101 transmits, upon receipt of the command, the access information and the terminal information stored in the near-field communication memory M215 to the mobile apparatus M102 (M1107).

The mobile apparatus M102 extracts the access information M701 out of the information received from the terminal apparatus M101, to thereby acquire the address information (server address M702) of the server apparatus M104 to be connected (M1108).

The communication system M100 according to this embodiment is intended to realize, by bringing the terminal apparatus M101 into touch with the mobile apparatus M102, customer registration including registering the serial number in the server apparatus M104 operated by the manufacturer of the terminal apparatus M101, operations to be made upon occurrence of an error, and customer service based on registration of the operation history information triggered by the error occurrence in the server.

Accordingly, the server address M702 of the server apparatus M104 to be connected is stored in the near-field communication memory M215 of the terminal apparatus M101. With such a configuration, the mobile apparatus M102 can be connected to the server apparatus M104 corresponding to the terminal apparatus M101, even though the mobile apparatus M102 is a one provided by a manufacturer different from that of the terminal apparatus M101.

In addition, in the case where the server address M702 is not stored in the terminal apparatus M101, the mobile apparatus M102 has to identify the manufacturer of the terminal apparatus M101, or a redundant server that redirects the information to a server of each manufacturer has to be prepared. However, storing the server address M702 in the terminal apparatus M101 allows such redundant systems to be eliminated, thereby contributing to reducing the total cost.

Then the mobile apparatus M102 combines the terminal information M705 received from the terminal apparatus M101 and the mobile apparatus information M720 stored in the mobile apparatus M102, to thereby generate the server communication information M731 to be transmitted to the server apparatus M104. After that, the mobile apparatus M102 transmits the server communication information M731 thus generated to the server apparatus M104 designated by the access information M701 received from the terminal apparatus M101 (M1109).

The server apparatus M104 stores and manages the terminal information M705 of the terminal apparatus M101 in the internal database in association with the mobile apparatus information M720 is of the mobile apparatus M102, on the basis of the server communication information M731 received (M1110).

The registration in the database by the server apparatus M104 is not necessary in the case where the same information is already registered. The server apparatus M104 first checks whether the mobile apparatus information M720 is already registered, and registers the mobile apparatus information M720 in the negative case. In the case where the same mobile apparatus information M720 is registered, the server apparatus M104 checks whether the terminal information M705 is registered in association with the mobile apparatus information M720. In the negative case, the server apparatus M104 registers the terminal information M705.

To decide whether the mobile apparatus information M720 is already registered, the server apparatus M104 employs at least one of the telephone number M722, the mail address M723, and the mobile apparatus identification information M721 contained in the mobile apparatus information M720. Here, the mobile apparatus identification information M721 refers to the identification information exclusive to each mobile apparatus M102, or the user identification information recorded in the mobile apparatus M102. The user identification information refers to, for example, the identification information recorded in the subscriber identity module (SIM) of the mobile phone terminal.

The server apparatus M104 then decides whether the firmware of the terminal apparatus M101 has to be updated on the basis of the firmware version M714 contained in the terminal information M705 received (M1111).

The server apparatus M104 also confirms the power source status of the terminal apparatus M101 on the basis of the main power source status information M704 contained in the terminal information M705 (M1112).

Further, the server apparatus M104 determines the writing capacity in the near-field communication memory M215 of the terminal apparatus M101 on the basis of the vacant region in writing region M901 contained in the terminal information M705 (M1113).

In the case where it is decided that the firmware has to be updated at the step M1111, the server apparatus M104 generates a content to be displayed on the display unit M110 of the mobile apparatus M102, on the basis of the power source status of the terminal apparatus M101 confirmed at the step M1112 and the vacant region for writing in the near-field communication memory M215 confirmed at the step M1113 (M1114). The content to be displayed is, for example, the message urging the user to turn on the power source of the terminal apparatus M101 displayed on the display unit M110 of the mobile apparatus M102, in the case where the power source of the terminal apparatus M101 is disconnected despite that the firmware has to be updated.

In the case where it is decided that the firmware has to be and can be updated through the steps M1111 to M1113, the server apparatus M104 transmits the firmware to be updated by the terminal apparatus M101 to the mobile apparatus M102 (M1115).

Upon receipt of the firmware transmitted from the server apparatus M104 (M1116), the mobile apparatus M102 once stores therein the received firmware. The mobile apparatus M102 also checks the digital signature for mobile apparatus M807 accompanying the firmware, to thereby decide whether the firmware has not been falsified in the communication path between the server apparatus M104 and the mobile apparatus M102 (M1117).

Upon completion of the verification of the digital signature for mobile apparatus M807 accompanying the firmware, the mobile apparatus M102 displays the message urging the user to bring the mobile apparatus M102 into touch with the terminal apparatus M101, on the display unit M110 (M1118).

When the mobile apparatus M102 is made to touch the terminal apparatus M101, the mobile apparatus M102 transmits the stored firmware to the terminal apparatus M101 through the near-field communication unit M107. The terminal apparatus M101 then stores the firmware to be updated in the main memory M106 of the terminal unit M201 (M1119).

The terminal unit M201 checks the digital signature for terminal apparatus M806 accompanying the firmware to thereby confirm that the firmware has not been falsified, before updating the firmware (M1120).

Thus, in this embodiment the firmware transmitted from the server apparatus M104 is verified by checking the digital signature for mobile apparatus M807 in the mobile apparatus M102, and verified by checking the digital signature for terminal apparatus M806 in the terminal apparatus M101. Accordingly, it can be confirmed that the firmware has not been falsified in the communication path between the server apparatus M104 and the mobile apparatus M102, and that the firmware has not been falsified in the mobile apparatus M102. Therefore, even though a malicious mobile apparatus M102 appears and falsifies the firmware, the falsification can be detected in the terminal apparatus M101, which allows the firmware to be safely updated.

As described above, the terminal apparatus M101 according to this embodiment stores the operation history information in the near-field communication memory M215 of the terminal apparatus M101 at the timing at which a malfunction has occurred in the terminal apparatus M101. Accordingly, only the operation history information immediately preceding the error occurrence is stored in the near-field communication memory M215. In addition, the power generated from the radiowave from the mobile apparatus M102 is supplied to the near-field communication unit M107. Such an arrangement allows the content of the near-field communication memory M215 to be read out by the mobile apparatus M102, even when the terminal unit M201 of the terminal apparatus M101 is unable to operate because of a failure. Reading thus the operation history information leading to the failure improves the reproducibility of the failure thereby enabling the repair work to be promptly performed. Consequently, loss of the cost can be significantly reduced.

It is preferable that the operation history information be encrypted by the terminal unit M201 of the terminal apparatus M101. This is because otherwise the operation history information could be read out by the mobile apparatus M102 provided by a manufacturer different from that of the terminal apparatus M101, which would incur the risk that such valuable information as the user's operation history is exposed to another manufacturer. Further, it is preferable that the encrypted operation history information be decodable only by the server apparatus M104 corresponding to the terminal apparatus M101. Accordingly, it is preferable that the address information of the server apparatus M104 corresponding to the terminal apparatus M101 be recorded in advance in the near-field communication memory M215 of the terminal apparatus M101. Such a configuration allows the server apparatus M104 to be operated with respect to each manufacturer of the terminal apparatus M101, and thus enables the customer registration of the terminal apparatus M101.

In addition, the server apparatus M104 can decide whether the firmware has to be and can be updated, on the basis of the version information of the firmware and the power source status of the terminal apparatus M101. Therefore, operations that fit the status of the terminal apparatus M101 can be performed.

Further, the server apparatus M104 registers the mobile apparatus information M720 of the mobile apparatus M102 in the database as primary information, and the terminal information M705 of the terminal apparatus M101 as secondary information. Here, the mobile apparatus information M720 is equivalent to user registration information in a customer registration made through a conventional server. For a normal user registration, the user has to input the name, address, mail address and so forth, which is troublesome. In contrast, employing the mobile apparatus information M720 as in this embodiment eliminates the need for the user to input the user registration information. Therefore, the user registration information can be automatically added to the terminal information M705 of the terminal apparatus M101 read out by the mobile apparatus M102, so as to be transmitted to the server apparatus M104 together with the terminal information M705. Normally, the registration information such as the name, address, and the mail address is utilized for the purpose of securing traceability of the user who owns the terminal apparatus M101. In this embodiment also, the exclusive identification information of the mobile apparatus M102, and the mail address and telephone number recorded in the mobile apparatus M102 can be utilized as the mobile apparatus information, which enables the user traceability to be secured. In the case where the mobile apparatus M102 according to this embodiment exemplifies a mobile phone, the entirety of the disclosure is applicable.

As substitute information for the address, the GPS installed in mobile phones and the like may be employed. Since the GPS provides position information with an accuracy of tens of meters, the position where the terminal apparatus M101 is installed can be precisely recognized, and also troublesome operation such as inputting the address can be minimized.

It is not mandatory to connect the terminal apparatus M101 according to this embodiment to a wide-use network such as the Internet. This is because the terminal apparatus M101 can be connected to the server apparatus M104 through the mobile apparatus M102 that can be connected to the wide-use network.

In addition, a module for the near-field communication is generally less expensive than a module for connection to the wide-use network. Therefore, a broader variety of terminal apparatuses M101 can be incorporated in the system. Consequently, the same user interface can be achieved with all the apparatuses.

In the case of the near-field communication, it is not mandatory to keep the terminal apparatus M101 connected to a power source. Therefore the terminal apparatus M101 does not have to be connected to a power source for the customer registration and so forth, which leads to improved user-friendliness. Further, power consumption by the near-field communication is significantly low, and therefore such a terminal apparatus M101 that is driven by a battery can be incorporated in the system.

As described above, the terminal apparatus M101 according to the embodiment of the present invention can surely transmit critical operation history information leading to the malfunction to the reader-writer apparatus, thereby providing solution to the issue of impossibility to reproduce the failure.

The terminal apparatus M101 can seamlessly switch between the mode in which the power source and the clock are supplied from the reader-writer apparatus to the near-field communication memory M215 accessed by near-field communication, and the mode in which the power source and the clock are supplied from the system. Such a configuration allows the terminal apparatus M101 to store only important operation history information in the near-field communication memory M215, and to transmit such operation history information to outside.

Further, the functional units included in the terminal apparatus M101, the mobile apparatus M102, and the server apparatus M104 according to the foregoing embodiment are typically realized as an LSI. Those units may be individually realized in a single chip, or a part or whole of the units may be realized in one chip.

The form of integration is not limited to the LSI, but an exclusive circuit or a general-purpose processor may be employed. Alternatively, a field programmable gate array (FPGA) that can be programmed after manufacturing the LSI, or a reconfigurable processor that allows reconfiguration of connection or setting of circuit cells in the LSI may be employed.

A part or whole of the functions of the terminal apparatus M101, the mobile apparatus M102, and the server apparatus M104 according to the embodiment of the present invention may be realized by execution of a program by a processor such as a CPU.

Further, the present invention may be realized as the mentioned program, or a recording medium in which the program is recorded. It is a matter of course that the program can be distributed through a transmission medium such as the Internet.

Further, at least a part of the functions of the terminal apparatus M101, the mobile apparatus M102, and the server apparatus M104 according to the embodiment and variations thereof may be employed in combination.

The numerical values cited in the foregoing description are merely exemplary, and the present invention is in no way limited to those values.

Further, the sequence of the steps shown in FIGS. 6 and 8 are merely exemplary, and may be modified as long as the same advantageous effect can be secured. In addition, a part of the foregoing steps may be performed simultaneously (in parallel) with another part of the steps.

Further, modifications that can be reached by those skilled in the art and made to the foregoing embodiment are included in the present invention, unless deviating from the scope and spirit of the present invention.

INDUSTRIAL APPLICABILITY

The present invention is applicable to a communication apparatus, and particularly advantageous when applied to a communication apparatus configured to perform near-field communication, and to a communication system that includes such a communication apparatus.

REFERENCE SIGNS LIST

M100 Communication system
M101 Terminal apparatus (Communication apparatus)
M102 Mobile apparatus
M103 Internet
M104 Server apparatus
M105 Controller
M106 Main memory
M107 Near-field communication unit
M108, M109 Antenna
M110 Display unit
M111, M202 Key
M201 Terminal unit
M203 Operation history detection unit
M204 Error detection unit
M205 Power source detection unit
M206 Power disconnection detection unit
M207 Main power source
M208 Power storage unit
M209 Main power source control unit
M210 Interface
M211 Switching unit
M212 Power source switching unit
M213 Clock switching unit
M214 Access switching unit
M215 Near-field communication memory
M216 Communication control unit
M217 Modulation unit
M218 Demodulation unit
M219 Power, source generation unit
M220 Clock generation unit
M230, M302 ROM region
M231, M310 RAM region
M232 FW region
M301, M706 Near-field communication unit identification information
M303, M707 Terminal apparatus identification information (Serial number)
M304, M708 Terminal apparatus model number (Product number)
M305, M709 Manufacturer identification information
M306, M710 Production lot identification information and production date
M307 Server access information
M308, M702 Server address (URL)
M309, M703 Server authentication information
M311 Reader-writer writing region
M312, M803, M904 Firmware
M313, M805 Terminal apparatus setting information
M314 Communication setting information
M315 Terminal unit writing region
M316, M711 Error detection information
M317, M712 Operation history information
M318, M713 Date and time of error occurrence
M319, M714 Firmware version
M320, M704 Main power source status information
M701 Access information
M705 Terminal information
M715, M902 Terminal information digital signature
M720 Mobile apparatus information
M721 Mobile apparatus identification information
M722 Telephone number
M723 Mail address
M724 Server account
M725 Server password
M726 Mobile apparatus position information
M727 Information digital signature
M728 User information
M731, M801 Server communication information
M802, M906 Firmware information
M804 Additional function information
M806 Digital signature for terminal apparatus
M807 Digital signature for mobile apparatus
M901 Vacant region in writing region
M903 Information digital signature
M905 Terminal apparatus activation command

The invention claimed is:

1. A communication apparatus comprising a system unit and a near-field communication unit,
wherein said system unit includes:
an operation history detection unit configured to generate operation history information of said communication apparatus;
an error detection unit configured to detect a malfunction of said system unit and generate error detection information about the malfunction;
a first storage unit configured to store the operation history information;
a system control unit configured to control said communication apparatus; and
a first power source unit configured to supply power to said system unit and said near-field communication unit,
said near-field communication unit includes:
an antenna unit configured to receive a radiowave from an external reader-writer apparatus;
a communication control unit configured to perform near-field communication with the reader-writer apparatus through said antenna unit;
a second storage unit configured to store identification information for identifying said communication apparatus, said second storage unit being readable by the reader-writer apparatus;
a second power source unit configured to generate power by rectifying the radiowave received from the reader-writer apparatus through said antenna unit;
a power source switching unit configured to select one of said first power source unit and said second power source unit, and supply power from the selected one of said power source units to said near-field communication unit;
a clock generation unit configured to generate a clock signal for activating said near-field communication unit, by rectifying the radiowave received from the reader-writer apparatus through said antenna unit; and
a clock switching unit configured to select one of the clock signal generated by said clock generation unit and a clock signal supplied by said system unit, as the clock signal for activating said near-field communication unit,
wherein
said system control unit is configured to store, in said second storage unit, the error detection information and at least a part of the operation history information stored in said first storage unit with said power source switching unit set to select said first power source unit and with said clock switching unit set to select the clock signal supplied by said system unit, when said error detection unit detects a malfunction of said system unit, and
said communication control unit is configured to transmit the identification information, the operation history information, and the error detection information stored in said second storage unit to the reader-writer apparatus through the near-field communication, in accordance with a request from the reader-writer apparatus.

2. The communication apparatus according to claim 1, wherein
said power source switching unit is configured to select said first power source unit, when said error detection unit detects a malfunction of said system unit.

3. The communication apparatus according to claim 2, wherein
said clock switching unit is configured to select the clock signal supplied by said system unit, as the clock signal for activating said near-field communication unit, when said error detection unit detects a malfunction of said system unit.

4. The communication apparatus according to claim 3, wherein said power source switching unit is configured to select said second power source unit, during a normal operation free from a malfunction detected by said error detection unit, and
said clock switching unit is configured to select the clock signal generated by said clock generation unit as the clock signal for activating said near-field communication unit.

5. The communication apparatus according to claim 3, wherein said power source switching unit is configured to switch said power source unit to be selected, in accordance with a request from said system control unit, and
said clock switching unit is configured to switch the clock signal to be selected, in accordance with a request from said system control unit.

6. The communication apparatus according to claim 1, wherein said first storage unit is configured to store the operation history information generated by said operation history detection unit by a wraparound addressing method, and further maintain an address position of the operation history information stored last in said first storage unit, and
said system control unit is configured to store, in said second storage unit, the operation history information stored in said first storage unit, by using the address position as reference, when said error detection unit detects a malfunction of said system unit.

7. The communication apparatus according to claim 6, wherein said system control unit is configured to confirm a storage capacity of said second storage unit when said error detection unit detects a malfunction of said system unit, to thereby determine a capacity in said second storage unit for storing the operation history information.

8. The communication apparatus according to claim 1, wherein said second storage unit is configured to delete the operation history stored therein by said near-field communication unit, after said near-field communication unit transmits the operation history information to the reader-writer apparatus through said antenna unit.

9. The communication apparatus according to claim 1, wherein said power source switching unit is configured to select said first power source unit when said first power source unit is activated.

10. The communication apparatus according to claim 9, wherein said power source switching unit is configured to be inhibited from switching between said first power source unit and said second power source unit, while said second storage unit is being accessed in accordance with a request from the reader-writer apparatus.

11. A non-transitory computer-readable recording medium for use in a computer, said recording medium having a computer program recorded thereon for causing a computer to execute a communication method performed by a communication apparatus including a system unit and a near-field communication unit,
the system unit including:
a first storage unit; and
a first power source unit configured to supply power to the system unit and the near-field communication unit,
the near-field communication unit including:
an antenna unit configured to receive a radiowave from a reader-writer apparatus;
a communication control unit configured to perform near-field communication with the reader-writer apparatus through the antenna unit;
a second storage unit configured to store identification information for identifying the communication apparatus, the second storage unit being readable by the reader-writer apparatus;
a second power source unit configured to generate power by rectifying the radiowave received from the reader-writer apparatus through the antenna unit;
a clock generation unit; and
a clock switching unit,
said method comprising:
generating operation history information of the communication apparatus;
storing the operation history information in the first storage unit;
detecting a malfunction of the system unit and generating error detection information about the malfunction;
selecting one of the first power source unit and the second power source unit, and supplying power from the selected power source unit to the near-field communication unit;
generating, with the clock generation unit, a clock signal for activating the near-field communication unit, by rectifying the radiowave received from the reader-writer apparatus through the antenna unit;
selecting, with the clock switching unit, one of the clock signal generated by the clock generation unit and a clock signal supplied by said system unit, as the clock signal for activating the near-field communication unit;
storing, in the second storage unit, the error detection information and at least a part of the operation history information stored in the first storage unit with the power source switching unit set to select the first power source unit and with the clock switching unit set to select the clock signal supplied by the system unit, when the error detection unit detects a malfunction of the system unit, and
transmitting the identification information, the operation history information, and the error detection information stored in the second storage unit to the reader-writer apparatus through the near-field communication, in accordance with a request from the reader-writer apparatus.

* * * * *